(12) United States Patent
Brouwers et al.

(10) Patent No.: US 11,925,306 B2
(45) Date of Patent: Mar. 12, 2024

(54) DOCKING STATION FOR AUTONOMOUS FLOOR CLEANER

(71) Applicant: BISSELL Inc., Grand Rapids, MI (US)

(72) Inventors: Andrew James Brouwers, Grand Rapids, MI (US); David VanKampen, Grand Rapids, MI (US); Jeffery Swan, Ovid, MI (US); Patryk D. Akhurst, Grand Rapids, MI (US); Jared Thomas, West Olive, MI (US)

(73) Assignee: BISSELL Inc., Grand Rapids, MI (US)

( * ) Notice: Subject to any disclaimer, the term of this patent is extended or adjusted under 35 U.S.C. 154(b) by 554 days.

(21) Appl. No.: 17/158,175

(22) Filed: Jan. 26, 2021

(65) Prior Publication Data

US 2021/0228039 A1 Jul. 29, 2021

Related U.S. Application Data

(60) Provisional application No. 62/967,074, filed on Jan. 29, 2020.

(51) Int. Cl.
*A47L 9/28* (2006.01)
*A47L 9/00* (2006.01)
(Continued)

(52) U.S. Cl.
CPC ........... *A47L 9/2873* (2013.01); *A47L 9/0063* (2013.01); *A47L 9/009* (2013.01); *A47L 9/2894* (2013.01);
(Continued)

(58) Field of Classification Search
CPC ...... A47L 9/2873; A47L 9/0063; A47L 9/009; A47L 9/2894; A47L 11/4005; A47L 11/4061; A47L 11/4066; A47L 11/4091; A47L 2201/022; A47L 2201/04; A47L 9/2826; A47L 2201/06; A47L 11/24; A47L 11/28; A47L 11/40; A47L 2201/02;
(Continued)

(56) References Cited

U.S. PATENT DOCUMENTS 7,352,153 B2 4/2008 Yan
7,933,687 B2 4/2011 Baek et al.
(Continued)

FOREIGN PATENT DOCUMENTS

CN 105511497 A 4/2016
CN 107885210 A 4/2018
(Continued)

*Primary Examiner* — Nghia M Doan
(74) *Attorney, Agent, or Firm* — Warner Norcross + Judd LLP

(57) ABSTRACT

A docking station for charging an autonomous floor cleaner includes a transmitter that can transmit a signal for detection by the robot. The docking station can include an opaque shroud for the transmitter and/or spring-loaded charging contacts. The autonomous floor cleaner can comprise a passive receiver that detects signals emitted from the docking station and a time-of-flight sensor for position/proximity sensing. The robot can selectively turn off the time-of-flight sensor when docking with or avoiding the docking station. Methods for docking, re-docking, low power charging, docking station avoidance, obstacle response during docking, and close-proximity docking are disclosed.

19 Claims, 25 Drawing Sheets

(51) Int. Cl.
*A47L 11/40* (2006.01)
*G05D 1/02* (2020.01)
*H02J 7/00* (2006.01)

(52) U.S. Cl.
CPC ....... *A47L 11/4005* (2013.01); *A47L 11/4061* (2013.01); *A47L 11/4066* (2013.01); *A47L 11/4091* (2013.01); *H02J 7/0042* (2013.01); *A47L 2201/022* (2013.01); *A47L 2201/04* (2013.01)

(58) Field of Classification Search
CPC .............. A47L 11/4008; A47L 2201/00; A47L 9/2852; H02J 7/0042; H02J 2310/14; H02J 7/0044; Y02B 70/30; Y02B 70/3225; G05D 1/0225; G05D 1/0242; G05D 2201/0203; G05D 1/0088; Y04S 20/222; Y04S 20/242
See application file for complete search history.

(56) References Cited

U.S. PATENT DOCUMENTS

| | | | |
|---|---|---|---|
| 8,301,305 | B2 | 10/2012 | Tsao et al. |
| 9,476,771 | B2 | 10/2016 | Teng et al. |
| 9,851,711 | B2 * | 12/2017 | Yoo ...................... A47L 9/2852 |
| 9,853,468 | B2 | 12/2017 | Ireland |
| 9,931,750 | B2 * | 4/2018 | Cohen ................. H02J 7/00714 |
| 2005/0156562 | A1 * | 7/2005 | Cohen ................... G01S 1/7034 |
| | | | 320/107 |
| 2018/0078106 | A1 | 3/2018 | Scholten et al. |
| 2018/0188737 | A1 * | 7/2018 | Won ..................... G05D 1/0225 |
| 2020/0022552 | A1 | 1/2020 | Han et al. |

FOREIGN PATENT DOCUMENTS

| | | |
|---|---|---|
| CN | 209360596 U | 9/2019 |
| CN | 110597254 A | 12/2019 |
| JP | 2018007908 A | 1/2018 |
| KR | 101437778 B1 | 9/2014 |

* cited by examiner

DOCKING STATION FOR AUTONOMOUS FLOOR CLEANER

CROSS-REFERENCE TO RELATED APPLICATION(S)

This application claims the benefit of U.S. Provisional Application No. 62/967,074, filed Jan. 29, 2020, which is incorporated herein by reference in its entirety.

BACKGROUND

Autonomous or robotic floor cleaners can move without the assistance of a user or operator to clean a floor surface. For example, the floor cleaner can be configured to vacuum or sweep dirt (including dust, hair, and other debris) into a collection bin carried on the floor cleaner. Some floor cleaners are further configured to apply and extract liquid for wet cleaning of bare floors, carpets, rugs, and other floor surfaces. The floor cleaner can move randomly about a surface while cleaning the floor surface or use a mapping/navigation system for guided navigation about the surface.

Often, these autonomous floor cleaners include a rechargeable battery, and charging contacts for the battery can be provided on an exterior surface of the floor cleaner. A charging cradle or docking station can be provided with corresponding charging contacts that can mate to the charging contacts on the floor cleaner. Some docking stations can also remove dirt stored in the collection bin.

Autonomous floor cleaners need to return to the docking station to recharge their battery and/or empty the collection bin. In some cases, users must manually return an autonomous floor cleaner to the docking station, which negates some of the convenience of autonomous cleaning. Automated docking processes are also known for some floor cleaners and docking stations. For example, some autonomous floor cleaners use IR beams on the docking station and IR receptors on the robot to detect the docking station and navigate until docked. Such systems, however, still exhibit numerous operational limitations, including difficulty in navigating to and properly aligning with the docking station, and cleaning around the docking station effectively.

To overcome the aforementioned problems, a reliable system and method for automatic docking must be developed.

BRIEF SUMMARY

The disclosure relates to an autonomous floor cleaner and to a docking station for an autonomous floor cleaner. Various methods for automatic docking of an autonomous floor cleaner with a docking station are described herein. Further, various methods for charging an autonomous floor cleaner at a docking station are described herein. Still further, various methods for navigation of an autonomous floor cleaner around a docking station or obstacle are described herein.

In one aspect, a docking station for an autonomous floor cleaner includes a housing, electrical contacts or charging contacts disposed on the housing that are adapted to mate with charging contacts of a robot to charge a battery of the robot, and at least one transmitter that can transmit at least one signal or encoded beam for detection by the robot.

In one embodiment, the docking station comprises multiple transmitters that can transmit at least one signal or encoded beam for detection by the robot. An opaque shroud can be provided for one or more of the transmitters to direct the light signals emitted from the transmitters along a desired path, reduce light bleed, and/or to define transmission zones for the transmitters. The shroud can have at least one shroud section enclosing a transmitter. The shroud section can include a wall around the transmitter and an aperture in the wall through which light from the transmitter is emitted. The wall can have an internal surface that faces the transmitter and reflective to the light emitted from the transmitter.

In one embodiment, the docking station comprises spring-loaded charging contacts. The charging contacts are biased by springs to a neutral position, which can correspond to a condition in which a robot is not docked with the docking station. A force applied to the spring-loaded charging contacts, i.e. the docking of a robot with the docking station, causes the charging contacts to move to a contact position, which can establish a positive electrical contact between the robot's charging contacts and the docking station charging contacts. Optionally, the docking station comprises an optical switch that is occluded by at least one of the spring-loaded charging contacts when depressed to indicate that a robot is present.

In one embodiment, the docking station includes a housing, charging contacts, a center transmitter configured to emit at least one light signal within a first transmission zone, a right transmitter disposed laterally of the center transmitter and configured to emit at least one light signal within a second transmission zone, and a left transmitter disposed laterally of the center transmitter and configured to emit at least one light signal within a third transmission zone. A shroud within the housing includes a center shroud section enclosing the center transmitter and defining a first light chamber, the first shroud section comprising an opaque first wall around the center transmitter and a first aperture in the first wall through which light is emittable, the first aperture defining a direction and angle of the first transmission zone, a right shroud section enclosing the right transmitter and defining a second light chamber, the second shroud section comprising an opaque second wall around the right transmitter and a second aperture in the second wall through which light is emittable, the second aperture defining a direction and angle of the second transmission zone, and a left shroud section enclosing the left transmitter and defining a third light chamber, third shroud section comprising an opaque third wall around the left transmitter and a third aperture in the third wall through which light is emittable, the third aperture defining a direction and angle of the third transmission zone.

In another aspect, the disclosure relates to an autonomous floor cleaning system including an autonomous floor cleaner and a docking station. The autonomous floor cleaner includes an autonomously moveable housing, a drive system for autonomously moving the housing over the surface to be cleaned, and a controller for controlling the operation of the autonomous floor cleaner.

In one embodiment, the autonomous floor cleaner can comprise a rechargeable battery, and electrical contacts or charging contacts for the battery can be provided on an exterior surface of the robot.

In one embodiment, the autonomous floor cleaner can comprise one or more receivers, which detect signals, emitted from a docking station. Optionally, autonomous floor cleaner can further include one or more time-of-flight sensors for position/proximity sensing. In one embodiment, the receivers are passive IR receivers operating at the same frequency as the time-of-flight sensors. In some embodiments, the robot selectively turns off the time-of-flight sensors when docking with or avoiding a docking station. At such times, the robot can rely upon the passive IR receivers and signals from the docking station to navigate.

The autonomous floor cleaner can comprise a recovery system. The recovery system can include a recovery pathway through the housing having an air inlet and an air outlet, a debris receptacle, bin, or recovery tank, and a suction source in fluid communication with the air inlet and the debris receptacle, bin, or recovery tank generating a working air stream through the recovery pathway.

The autonomous floor cleaner can comprise a fluid delivery system. The fluid delivery system can include a supply tank for storing a supply of cleaning fluid, at least one fluid distributor in fluid communication with the supply tank, and a fluid delivery pump configured to control a flow of the cleaning fluid to the at least one fluid distributor.

In yet another aspect, a method for automatic docking of an autonomous floor cleaner with a docking station is provided. In one embodiment, when a return to dock event occurs, the robot can turn off time-of-flight sensors and rely on passive receivers and docking signals from the docking station to dock with a docking station. The method can include driving toward the docking station, rotating the robot to align is charging contacts with the docking station, and docking with the docking station.

In still another aspect, a method for re-docking a robot at a docking station after a lost charge is provided. In one embodiment, if the robot loses charging contact with the docking station after docking, the robot can drive away from the docking station, realign with the docking station relying on passive receivers and short docking signals from the docking station, and re-dock with the docking station.

In even another aspect, a method for low power charging of a robot by a docking station is provided. In one embodiment, while the robot is docked, the docking station is configured to operate in a wake mode and in a sleep mode, and wherein the docking station is further configured to enter the sleep mode after completely charging the battery and stop charging the battery, and resuming charging the battery after switching from the sleep mode to the wake mode. In such embodiments, the docking station may further be configured to revert back to the sleep mode once the battery is sufficiently charged, i.e. topped off.

In yet a further aspect, a method for docking station avoidance performed by a robot is provided. In one embodiment, if the robot detects a long range docking signal during cleaning, the robot can turn off time-of-flight sensors and rely on passive receivers and keep out signals from the docking station to navigate around and/or away from the docking station.

In still a further aspect, a method for obstacle response during docking performed by a robot is provided. In one embodiment, if the robot encounters an obstacle during docking, or re-docking, the robot can temporality ignore all docking signals from the docking station and executes an obstacle avoidance behavior. Once the obstacle has been avoided, the robot can resume following docking signals from the docking station.

In even a further aspect, a method for close-proximity docking performed by the robot is provided. In one embodiment, when a return to dock event occurs when the robot is already within range of a short range docking signal, the robot can turn off time-of-flight sensors and rely on passive receivers and short docking signals from the docking station to dock with a docking station.

These and other features and advantages of the present disclosure will become apparent from the following description of particular embodiments, when viewed in accordance with the accompanying drawings and appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

The disclosure generally relates to docking stations for autonomous floor cleaners. More specifically, the disclosure relates to a docking station for charging the battery of an autonomous floor cleaner, and methods of locating the docking station to avoid or dock with the docking station.

Figure 1:
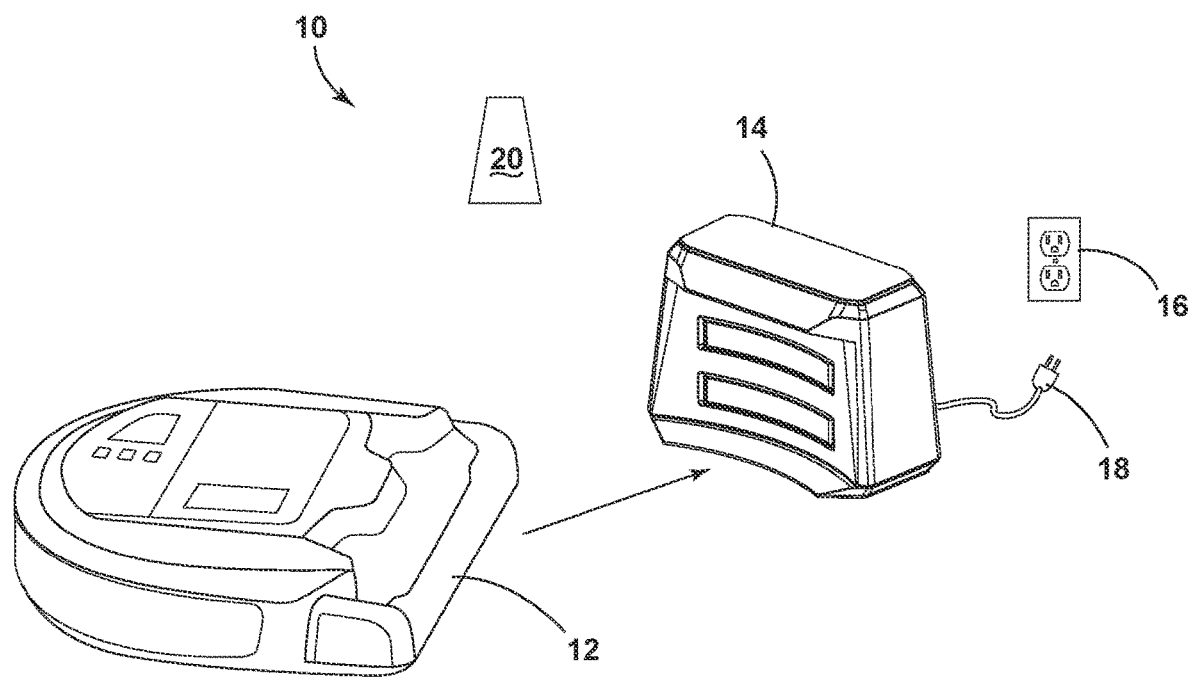
FIG. 1 is a schematic view of an autonomous floor cleaning system according to one embodiment of the invention, the system including at least an autonomous floor cleaner, or robot, and a docking station.

FIG. 1 is a schematic view of an autonomous floor cleaning system 10 according to one embodiment of the invention. The autonomous floor cleaning system 10 includes an autonomous floor cleaner 12 and a docking station 14 for the autonomous floor cleaner 12. The autonomous floor cleaner 12 can clean various floor surfaces, including bare floors such as hardwood, tile, and stone, and soft surfaces such as carpets and rugs. Optionally, an artificial barrier system 20 can be provided with the system 10 for containing the autonomous floor cleaner 12 within a user-determined boundary.

In one embodiment, the autonomous floor cleaner 12 can be a dry vacuum cleaning robot including at least a vacuum collection system for creating a partial vacuum to suck up debris (which may include dirt, dust, soil, hair, and other debris) from a floor surface, and collect the removed debris in a space provided on the robot for later disposal.

In another embodiment, the autonomous floor cleaner 12 can be a deep cleaning robot including a fluid delivery system for storing cleaning fluid and delivering the cleaning fluid to the surface to be cleaned and a fluid recovery system for removing the cleaning fluid and debris from the surface to be cleaned and storing the recovered cleaning fluid and debris. The fluid delivery system may be configured to delivery liquid, steam, mist, or vapor to the surface to be cleaned.

In yet another embodiment, the autonomous floor cleaner 12 can be a wet mopping or sweeping robot including a fluid delivery system for storing cleaning fluid and delivering the cleaning fluid to the surface to be cleaned and a mopping or sweeping system for removing cleaning fluid and debris from the surface to be cleaned without the use of suction. The fluid delivery system may be configured to delivery liquid, steam, mist, or vapor to the surface to be cleaned.

In still another embodiment, the autonomous floor cleaner 12 can be a dry sweeping robot including a sweeping system for removing dry debris from the surface to be cleaned without the use of suction, and collect the removed debris in a space provided on the robot for later disposal.

The docking station 14 can recharge a power supply of the autonomous floor cleaner 12. In one example, the docking station 14 can be connected to a household power supply, such as an A/C power outlet 16, and can include a converter 18 for converting the AC voltage into DC voltage for recharging the power supply on-board the autonomous floor cleaner 12, which may be a battery. The docking station 14 can also include various sensors and emitters (not shown) for monitoring a status of the autonomous floor cleaner 12, enabling auto-docking functionality, communicating with the of the autonomous floor cleaner 12, as well as features for network and/or Bluetooth connectivity.

In another embodiment, in addition to or as an alternative to recharging the autonomous floor cleaner 12, the docking station 14 can perform service, maintenance, or diagnostic checks for the autonomous floor cleaner 12. For example, the docking station 14 can be configured to automatically empty a collection bin in the case of a dry vacuum or deep cleaning robot, and/or automatically fill or refill a supply tank in the case of a deep cleaning robot.

Figure 2:
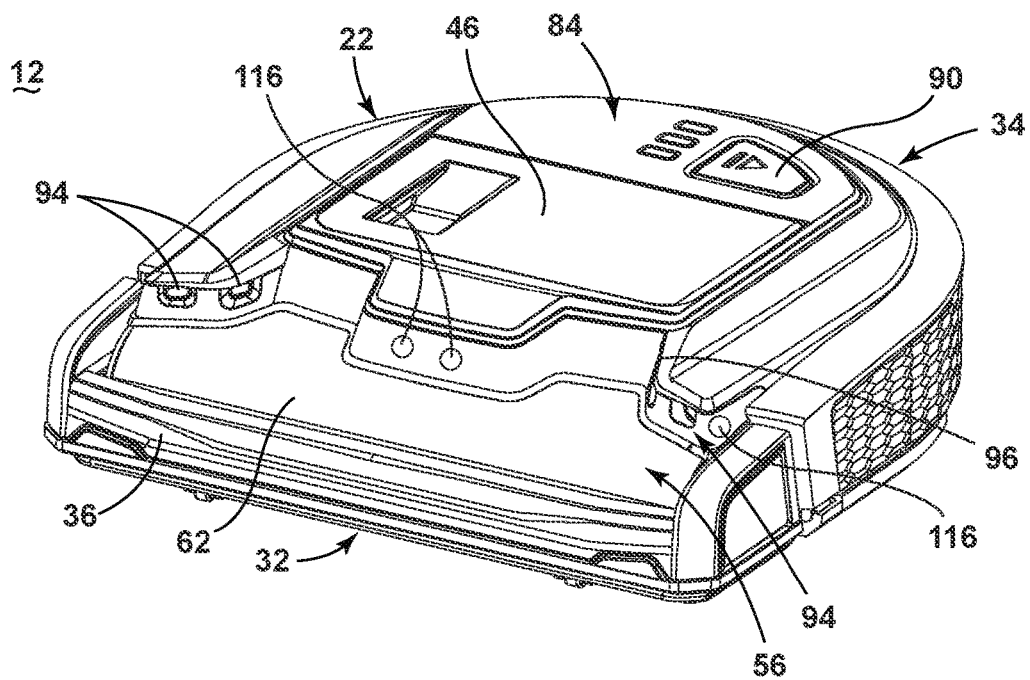
FIG. 2 is a perspective view of one embodiment of an autonomous floor cleaner or robot for the system of FIG. 1.
Figure 3:
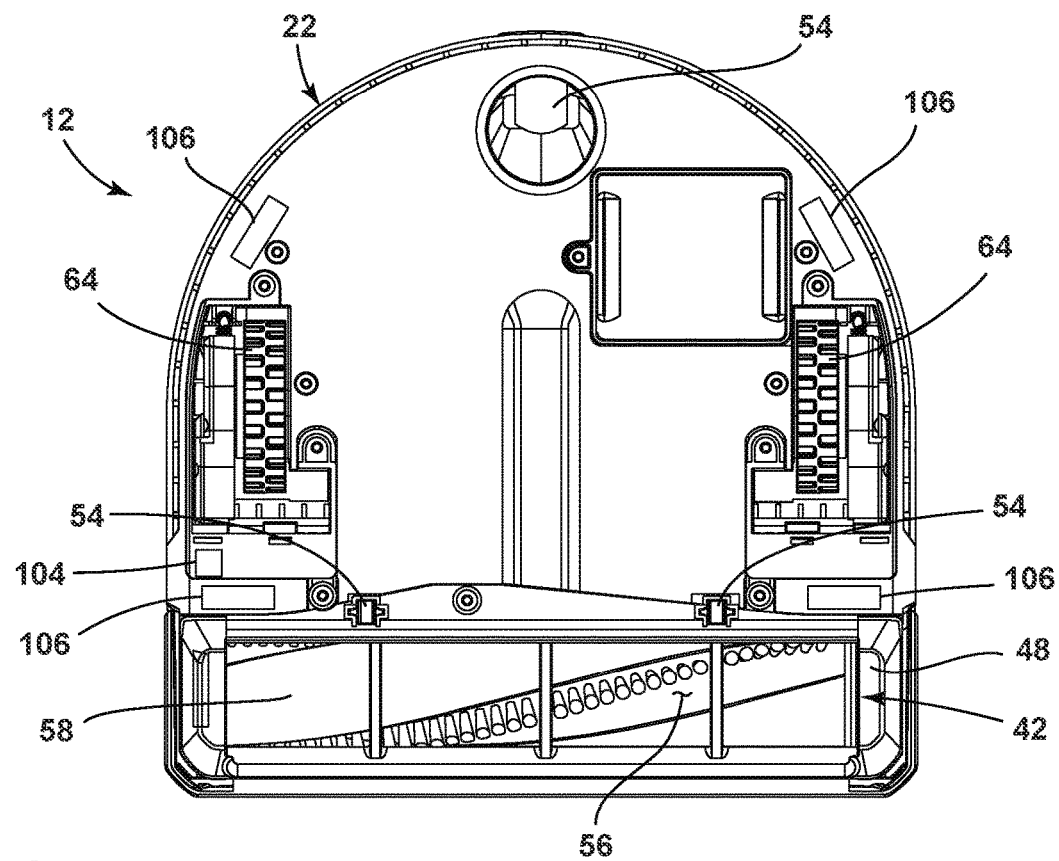
FIG. 3 is a bottom view of the robot from FIG. 2.
Figure 4:
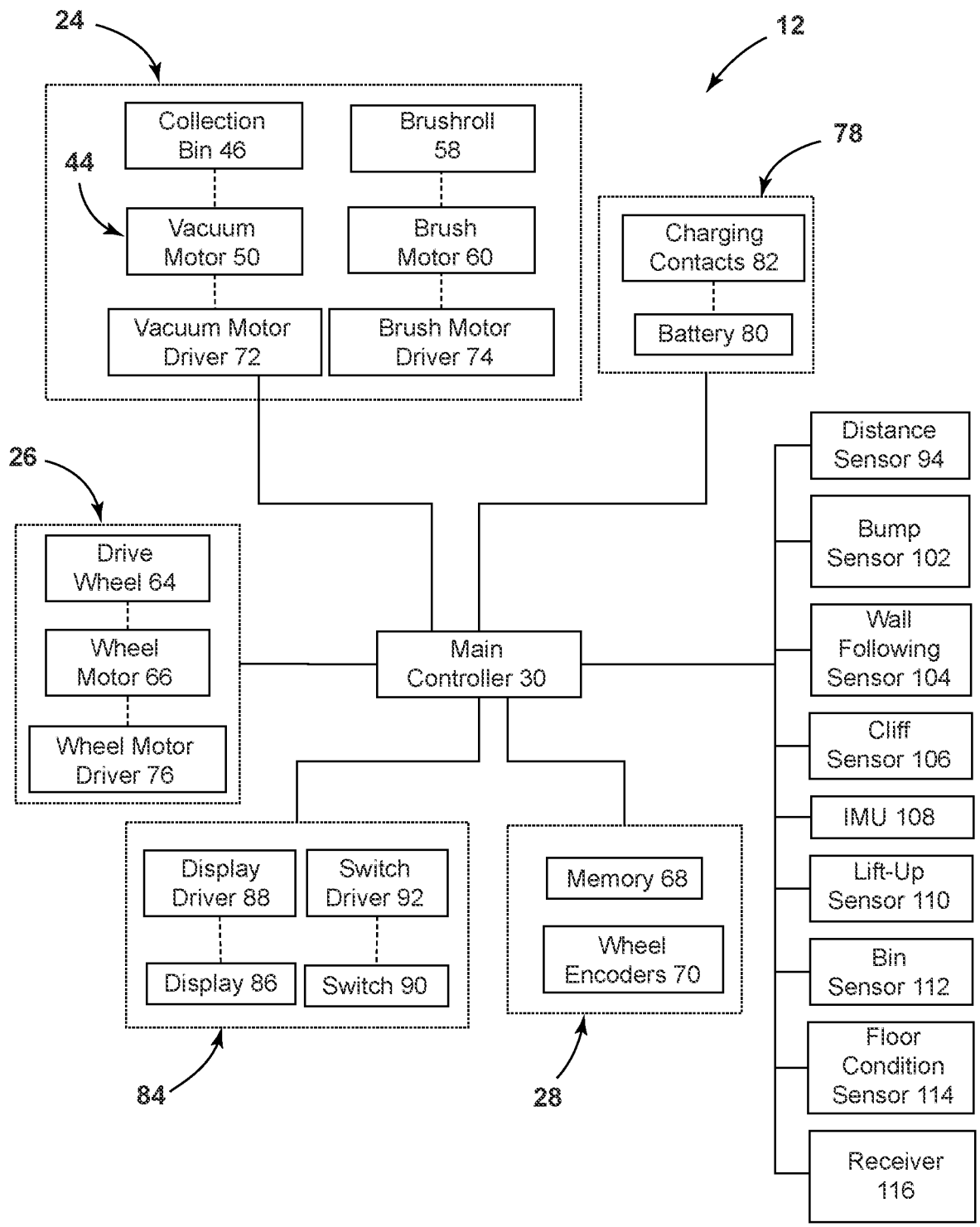
FIG. 4 is a schematic view of the robot from FIG. 2.

FIGS. 2-4 illustrate one embodiment of the autonomous floor cleaner 12 for the system 10 of FIG. 1, also referred to herein as robot 12. It is noted that the robot 12 shown in FIGS. 2-4 is but one example of an autonomous floor cleaner that is usable with the system 10 and with the docking station 14, and that other autonomous floor cleaners can be used with the system 10 and docking station 14.

The robot 12 mounts the components various functional systems of the autonomous floor cleaner in an autonomously moveable unit or housing 22, including components of a vacuum collection system 24 for generating a working air flow for removing dirt (including dust, hair, and other debris) from the surface to be cleaned and storing the dirt in a collection space on the vacuum cleaner, a drive system 26 for autonomously moving the robot 12 over the surface to be cleaned, and a navigation/mapping system 28 for guiding the movement of the robot 12 over the surface to be cleaned, generating and storing maps of the surface to be cleaned, and recording status or other environmental variable information.

A controller 30 is operably coupled with the various functional systems 24, 26, 28 of the robot 12 for controlling the operation of the robot 12. The controller 30 can be a microcontroller unit (MCU) that contains at least one central processing unit (CPU).

As shown, the housing 22 of the robot 12 can be a D-shaped, with a first end 32 and a second end 34. The first end 32 defines the front of the robot 12 and can be a straightedge portion of the D-shaped housing 22, optionally comprising a bumper 36. The second end 34 can define the rear of the robot 12 and can be a rounded portion of the D-shaped housing 22. Other shapes and configurations for the robot 12 are possible, including that the rounded portion of the D-shaped housing 22 can define the front of the robot 12 and the straightedge portion of the D-shaped housing 22 can define the rear of the robot 12.

Forward motion of the robot 12 is illustrated with an arrow 38, and the bumper 36 wraps around the first end 32 of the robot 12 to cover the front of the robot 12. During a collision with an obstacle, the bumper 36 can shift or translate to register a detection of an object. The bumper 36 can also wrap around and cover a portion of each lateral side 40 of the robot 12, and may optionally be adapted for a dual-direction movement to sense obstacles in front of and on the sides of the robot 12. The lateral sides 40 of the robot 12 extend between the first end 32 and the second end 34 of the robot 12.

The vacuum collection system 24 can include a working air path through the unit having an air inlet and an air outlet, a suction nozzle 42, a suction source 44 in fluid communication with the suction nozzle 42 for generating a working air stream, and a collection bin 46 for collecting dirt from the working airstream for later disposal. The suction nozzle 42 can define the air inlet of the working air path, with the inlet opening of the suction nozzle 23 provided on an underside 48 of the housing 22 and facing a surface to be cleaned. The suction source 44 can include a vacuum motor 50 carried by the housing 22, fluidly upstream of the air outlet (not shown), and can define a portion of the working air path. The collection bin 46 can also define a portion of the working air path, and comprise a dirt bin inlet (not shown) in fluid communication with the suction nozzle 42. Optionally, a separator (not shown) can be formed in a portion of collection bin 46 for separating fluid and entrained dirt from the working airstream. Some non-limiting examples of separators include a cyclone separator, a filter screen, a foam filter, a HEPA filter, a filter bag, or combinations thereof. Optionally, a pre-motor filter and/or a post-motor filter (not shown) can be provided in the working air path as well. The working air path can further include various conduits, ducts, or tubes for fluid communication between the various components of the vacuum collection system 24. The vacuum motor 50 can be positioned fluidly downstream or fluidly upstream of the collection bin 46 in the working air path.

The robot 12 can include a brush chamber 56 at the front of the housing 22 in which a brushroll 58 is mounted. The brushroll 58 is mounted for rotation about a substantially horizontal axis, relative to the surface over which the robot 12 moves. A drive assembly including a brush motor 60 can be provided within the robot 12 to drive the brushroll 58. In other embodiments, other configurations of agitators or brushrolls can be provided, including one or more stationary or non-moving brushes, or one or more brushes that rotate about a substantially vertical axis.

In the present embodiment, the brushroll 58 is mounted at the front of the robot 12, with the brushroll 58 generally parallel to the first end 32. The brushroll 58 can by at least partially enclosed by a transparent window 62 at the front of the housing 22.

The drive system 26 can include drive wheels 64 for driving the robot 12 across a surface to be cleaned. The drive wheels 64 can be operated by a common wheel motor 66 or individual wheel motors 66 coupled with the drive wheels 64 by a transmission, which may include a gear train assembly or another suitable transmission. The drive system 26 can receive inputs from the controller 30 for driving the robot 12 across a floor, based on inputs from the navigation/mapping system 28 for the autonomous mode of operation or based on inputs from a smartphone, tablet, or other remote device for an optional manual mode of operation. The drive wheels 64 can be driven in a forward or reverse direction to move the unit forwardly or rearwardly. Furthermore, the drive wheels 64 can be operated simultaneously at the same rotational speed for linear motion or independently at different rotational speeds to turn the robot 12 in a desired direction. While the drive system 26 is shown herein as including rotating wheels 64, it is understood that the drive system 26 can comprise alternative traction devices for moving the robot 12 across a surface to be cleaned.

In addition to the drive wheels 64 or other traction devices, the robot 12 can include one or more additional wheels 54 which support the housing 22, such as a castor wheel at a center, rear portion of the underside 48 of the housing 22, and a pair of wheels adjacent a rear edge of the opening defining the suction nozzle 42.

The controller 30 can receive input from the navigation/mapping system 28 or from a remote device such as a smartphone (not shown) for directing the robot 12 over the surface to be cleaned. The navigation/mapping system 28 can include a memory 68 that can store any data useful for navigation, mapping or conducting a cycle of operation, including, but not limited to, maps for navigation, inputs from various sensors that are used to guide the movement of the robot 12, etc. For example, wheel encoders 70 can be placed on the drive shafts of the drive wheels 64 and configured to measure a distance traveled by the robot 12. The distance measurement can be provided as input to the controller 30. In another example, the navigation/mapping system 28 can receive inputs from the docking station 14 that are used to guide the movement of the robot 12 to dock at the docking station 14 and/or to avoid the docking station 14 during a cleaning operation. Such inputs can comprise docking signals and/or avoidance signals, also referred to herein as keep out signals, embodiments of which are described in further detail below.

In an autonomous mode of operation, the robot 12 can be configured to travel in any pattern useful for cleaning or sanitizing including boustrophedon or alternating rows (that is, the robot 12 travels from right-to-left and left-to-right on alternate rows), spiral trajectories, etc., while cleaning the floor surface, using input from various sensors to change direction or adjust its course as needed to avoid obstacles. In the optional manual mode of operation, movement of the robot 12 can be controlled using a mobile device such as a smartphone or tablet.

The robot 12 can include any number of motors useful for performing locomotion and cleaning. In one example, three dedicated motors 50, 60, 66, can respectively be provided to generate a partial vacuum at the suction nozzle 4, rotate the brushroll 58, and drive the wheels 64 In another example, these locomotion and cleaning operations are performed by less than three or more than three motors.

The robot 12 can include any number of motor drivers for controlling the motors 50, 60, 66. In the embodiment shown, a vacuum motor driver 72, a brush motor driver 74, and a wheel motor driver 76 can be provided for controlling the vacuum motor 50, brush motor 60, and wheel motors 66, respectively. The motor drivers 72-76 can act as an interface between the controller 30 and their respective motors. The motor drivers 72-76 can also be an integrated circuit chip (IC).

The motor drivers 72-76 can be electrically coupled to a battery management system 78 that includes a rechargeable battery 80, which may comprise battery pack. In one example, the battery pack can comprise a plurality of can include lithium ion batteries. Batteries with other cell chemistries, such as nickel metal hydride and nickel cadmium, are also possible. Electrical contacts or charging contacts 82 for the battery 80 can be provided on an exterior surface of the robot 12. In one embodiment, the charging contacts 82 are provided on the second end or rear side 34 of the robot 12. In another embodiment, the charging contacts 82 are provided on the underside 48 of the robot 12.

The controller 30 is further operably coupled with a user interface (UI) 84 on the robot 12 for receiving inputs from a user. The UI 84 can be used to select an operation cycle for the robot 12 or otherwise control the operation of the robot 12. The UI 84 can have a display 86, such as an LED display, for providing visual notifications to the user. A display driver 88 can be provided for controlling the display 86, and acts as an interface between the controller 30 and the display 86. The display driver 88 may be an IC. The robot 12 can be provided with a speaker (not shown) for providing audible notifications to the user.

The UI 84 can further have one or more switches 90 that are actuated by the user to provide input to the controller 30 to control the operation of various components of the robot 12. A switch driver 92 can be provided for controlling the switch 90, and acts as an interface between the controller 30 and the switch 90.

The robot 12 can be provided with one or more cameras or stereo cameras (not shown) for acquiring visible notifications from the user. In this way, the user can communicate instructions to the robot 12 by gestures. For example, the user can wave their hand in front of the camera to instruct the robot 12 to stop or move away.

The controller 30 can be operably coupled with various sensors on board the robot 12 for receiving input about the environment and from the docking station 14, and can use the sensor input to control the operation of the robot 12, as described in further detail below. Some sensors may detect features of the surrounding environment of the robot 12 including, but not limited to, walls, floors, furniture, pets, stairs, ledges, etc. Some sensors may detect the docking station 14. The sensor input can further be stored in the memory 68 or used to develop maps by the navigation/mapping system 28. Some exemplary sensors are illustrated in FIG. 4, and described below. Although it is understood that not all sensors shown may be provided, additional sensors may be provided, and that all of the possible sensors can be provided in any combination.

The robot 12 can include one or more distance sensor(s) 94 for position/proximity sensing. Each distance sensor 94 has a field of view, or sensing zone, which can optionally overlap each other, to detect obstacles towards the front and sides of the robot 12. Input from the distance sensors 94 is used by the controller 30 to slow down and/or adjust the course of the robot 12 when objects are detected by the sensors 94.

In the embodiment illustrated, four distance sensors 94 are provided, two near each lateral side of the housing 22. Other numbers and locations for the distance sensors 94 are possible. The sensors 94 are mounted to the housing 22, above the window 62, and behind a transparent or translucent portion of the housing 22. For example, the housing 22 can comprise a transparent or translucent sensor cover 96 for covering and protecting the sensors 94, while also admitting a light signal therethrough. The sensor cover 96 can comprise a single, continuous sensor cover or include individual lens inserts for each distance sensor 94.

The robot 12 may include one or more of a bump sensor 102, a wall following sensor 104, a cliff sensor 106, an inertial measurement unit (IMU) 108, a lift-up sensor 110, a bin sensor 112, or a floor condition sensor 114, including any combination or multiples thereof.

The bump sensor 102 determines front or side impacts to the robot 12, and may be integrated with the housing 22, such as with a bumper 36 (FIG. 2). Output signals from the bump sensors 102 provide inputs to the controller 30 for selecting an obstacle avoidance algorithm.

The wall following sensor 104 (also known as a side wall sensor) can be located near the side of the housing 22 and can include a side-facing position sensor that provides distance feedback and controls the robot 12 so that the robot 12 can follow near a wall without contacting the wall. The wall following sensor 104 can be an optical, mechanical, or ultrasonic sensor, including a reflective or time-of-flight sensor. In another embodiment, a wall following sensor is not provided, and the distance sensors 94 are instead used as wall following sensors.

The cliff sensor 106 can be a ground-facing position sensor that provides distance feedback so that the robot 12 can avoid excessive drops down stairwells, ledges, etc. The cliff sensor 106 can be an optical, mechanical, or ultrasonic sensor, including a reflective or time-of-flight sensor.

The IMU 108 measures and reports the robot's acceleration, angular rate, or magnetic field surrounding the robot 12, using a combination of at least one accelerometer, gyroscope, and, optionally, magnetometer or compass. The IMU 108 can be an integrated inertial sensor located on the controller 30 and can be a nine-axis gyroscope or accelerometer to sense linear, rotational or magnetic field acceleration. The IMU 108 can use acceleration input data to calculate and communicate change in velocity and pose to the controller 30 for navigating the robot 12 around the surface to be cleaned.

The lift-up sensor 110 detects when the robot 12 is lifted off the surface to be cleaned e.g. if a user picks up the robot 12. This information is provided as an input to the controller 30, which can halt operation of the motors 50, 60, 66 in response to a detected lift-up event. The lift-up sensor 110 may also detect when the robot 12 is in contact with the surface to be cleaned, such as when the user places the robot 12 back on the ground. Upon such input, the controller 30 may resume operation.

The robot 12 can optionally include a bin sensor 112 for detecting a characteristic or status of the collection bin 46. In one example, a pressure sensor for detecting the weight of the collection bin 46 can be provided. In another example, a magnetic sensor for detecting the presence of the collection bin 46 can be provided. This information is provided as an input to the controller 30, which may prevent operation of the robot 12 until the collection bin 46 is emptied or properly installed, in non-limiting examples. The controller 30 may also direct the display 86 to provide a notification to the user that the collection bin 46 is full or missing.

The floor condition sensor 114 detects a condition of the surface to be cleaned. For example, the robot 12 can be provided with an infrared (IR) dirt sensor, a stain sensor, an odor sensor, or a wet mess sensor. The floor condition sensor 114 provides input to the controller 30 that may direct operation of the robot 12 based on the condition of the surface to be cleaned, such as by selecting or modifying a cleaning cycle. Optionally, the floor condition sensor 114 can also provide input for display on a smartphone.

Figure 5:
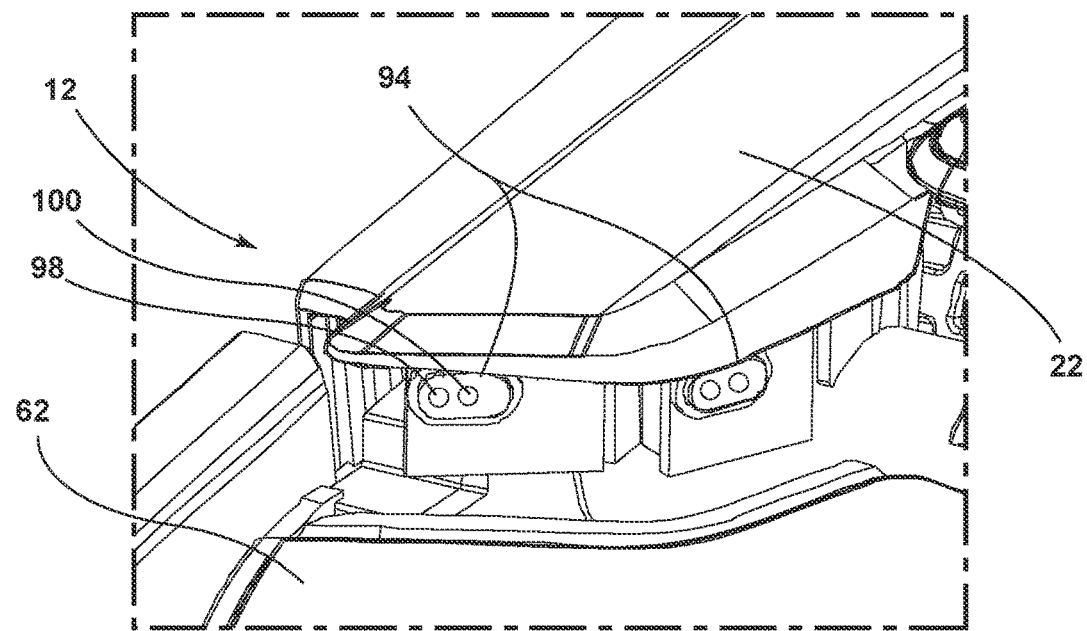
FIG. 5 is an enlarged view of portion of the robot with a sensor cover removed, showing one embodiment of a distance sensor for the robot.

Referring to FIG. 5, a portion of the robot 12 with the sensor cover 96 removed is shown. One or more of the distance sensors 94 can be infrared sensors or time-of-flight (TOF) sensors. In the embodiment shown herein, each TOF sensor 94 has an emitter 98 and a receiver 100. The TOF sensors 94 measure the time it takes for a light signal to travel from the emitter 98 to the receiver 100 for determining a precise distance to objects in proximity to the robot 12. The emitter 98 emits a pulsed light signal and can comprise an LED emitting the light signal. In one embodiment, the LED can be an infrared LED emitting an infrared light beam.

Figure 7:
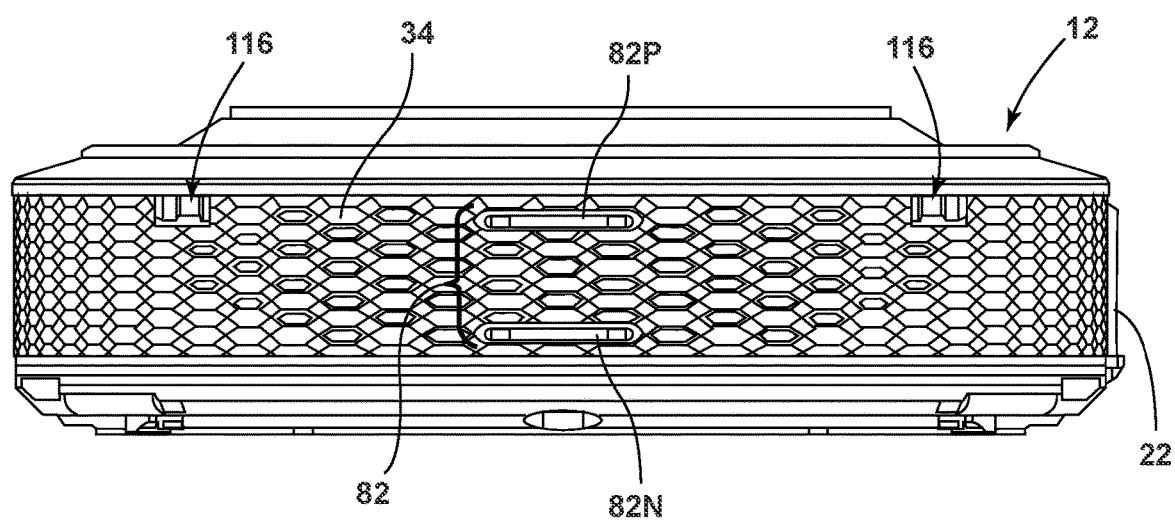
FIG. 7 is a rear view of the robot from FIG. 2, showing one embodiment of charging contacts for the robot.

Referring to FIGS. 2, 4, and 7, the robot 12 can have at least one receiver 116 to detect signals emitted from the docking station 14. In some cases, the at least one receiver 116 is an IR receiver or IR transceiver that detects IR signals, such as encoded IR beams, emitted from the docking station 14. Optionally, the robot 12 comprises multiple receivers 116 that can detect at least one signal, i.e. an encoded beam, emitted from the docking station 14. In one embodiment, the receivers 116 are passive IR receivers, separate from the TOF sensors 94.

The receivers 116 are disposed in different locations on the housing 22 of the robot 12 and spaced from each other so that signals from the docking station 14 can be detected when the robot 12 is disposed at different orientations relative to the docking station 14 as described further below. For example, receivers 116 may be provided on the front 32, rear 34, and/or lateral sides 40 of the housing 22 to receive signals transmitted from the docking station 14.

The receivers 116 can be mounted behind a transparent or translucent portion of the housing 22. For example, at least some of the receivers 116 can be mounted behind the sensor cover 96. The sensor cover 96 can comprise a single, continuous sensor cover or include individual lens inserts for each distance sensor 94. At least some other receivers 116, such as those on the rear 34 of the housing 22, can be mounted behind other transparent or translucent covers (see FIG. 7).

Figure 6:
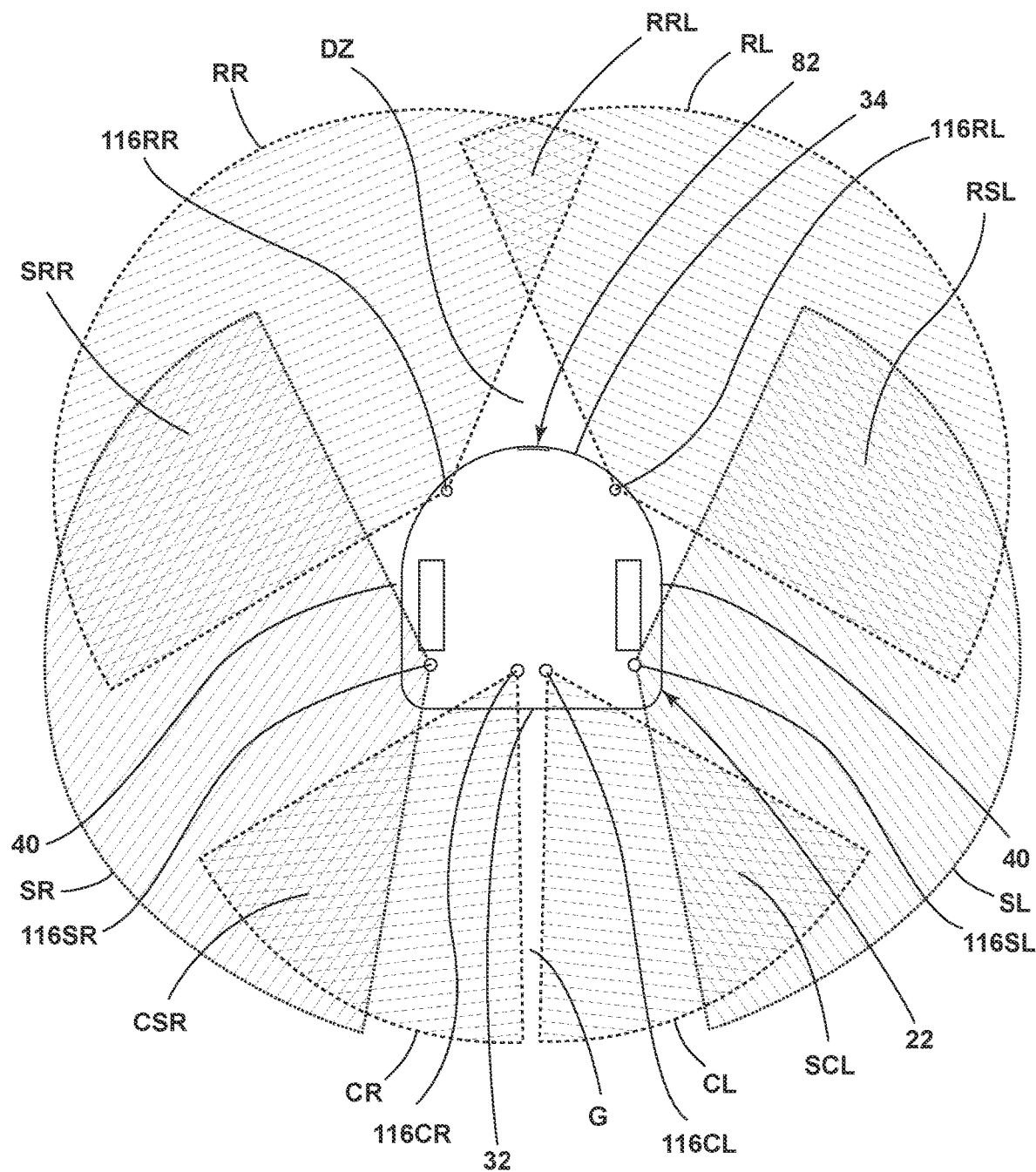
FIG. 6 is a top schematic view of the robot, showing multiple receivers in one exemplary layout and a coverage pattern provided by the receivers.

FIG. 6 shows one embodiment of a receiver layout for the robot 12 and coverage pattern provided by the receivers 116. Multiple receivers 116 are provided, including a first or center right receiver 116CR, a second or side right receiver 116SR, a third or rear right receiver 116RR, a fourth or center left receiver 116CL, a fifth or side left receiver 116SL, and a sixth or rear left receiver 116RL. Each receiver 116 has a field of view or sensing zone. These zones collectively define the coverage pattern for the robot 12. The first or center right receiver 116CR is located at or near the front 32 of the housing 22, and is generally forward facing to provide a zone CR that covers a right half of the front side of the robot 12. The second or side right receiver 116SR is located on the right lateral side 40 of the housing and is generally side facing to provide a zone SR that covers a right lateral side of the robot 12. The third or rear right receiver 116RR is located on the rear 34 of the housing 22, and is generally rear facing to provide a zone RR that covers a right rear side of the robot 12. The fourth or center left receiver 116CL is located at or near the front 32 of the housing, and is generally forward facing to provide a zone CL that covers a left half of the front side of the robot 12. The fifth or side left receiver 116SL is located on the left lateral side 40 of the housing 22 and is generally side facing to provide a zone SL that covers a left lateral side of the robot 12. The sixth or rear left receiver 116RL is located on the rear 34 of the housing 22, and is generally rear facing to provide a zone RL that covers a rear left side of the robot 12. Other positions and numbers of receivers 116 may be used. It is noted that the receiver layout is schematically shown in FIG. 5, with receiver locations schematically depicted. In practice, receivers 116 may be located at various positions within the housing 22, behind transparent or translucent portions of the housing 22.

At least some of the receivers 116 can be oriented to provide overlapping field of views. As the robot 12 travels over a floor surface, the field of view or zone in which a signal from the docking station 14 is sensed can change, or may be detected by more than receiver 116. This allows the robot 12 to accurately and precisely determine the fore/aft and lateral position of the docking station 14 in proximity to the robot 12. In the illustrated embodiment, the center right zone CR overlaps with the side right zone SR at area CSR, the side right zone SR overlaps the rear right zone RR at area SRR, the rear right zone RR overlaps the rear left zone RL at area RRL, the rear left zone RL overlaps the side left zone SL at rear RSL, and the side left zone SL overlaps the center left zone CL at area SCL.

Optionally, the center right zone CR and center left zone CL do not overlap each other. This creates a zone gap G at the center front side of the robot 12. This zone gap G can be used for navigation, and can be used to direct the robot 12 move in a straight line along the boundary between the center zones when docking, as described in further detail below. In the embodiment shown, the zone gap G is narrow relative to the center zones CR, CL, which can allow the robot 12 to remain on a tight path by adjusting the robot's heading keep signals from the docking station 14 within the zone gap G. In one example, the zone gap G may have a near-constant width of 15 mm, while the center zones CR, CL may have a minimum width of 7 mm and which increases in a direction away from the robot 12. By having a "near-constant" width, the zone gap G may deviate ±1 mm, alternatively ±2 mm.

Optionally, a rear dead zone DZ can be created between the rear right zone RR and rear left zone RL. This dead zone DZ can be located at the center of the rear 34 of the robot 12. This dead zone DZ can also be used for navigation when docking with or avoiding the docking station 14, as described in further detail below. In the embodiment shown, the dead zone DZ is triangular, and narrows to a point where the rear zones RR, RL intersect.

The at least one receiver 116 outputs corresponding signals to the controller 30, which can be used to control the operation of the robot 12. For example, upon receiving a predetermined signal from the docking station 14, the controller 30 can adjust drive wheel control parameters to avoid the docking station 14. In another example, upon receiving another predetermined signal from the docking station 14, the controller 30 can adjust drive wheel control parameters to guide the robot 12 toward the docking station 14.

Referring to FIG. 7, a rear portion of the robot 12 is shown, including the charging contacts 82 provided on the second end or rear side 34 of the robot 12. In one embodiment, a positive charging contact 82P and a negative charging contact 82N are utilized to detect a completed circuit when the robot 12 docks with the docking station 14. In other embodiments, a single charging contact 82 or more than two charging contacts 82 may be utilized. An additional charging contact would provide redundancy in the event that one of the other charging contacts becomes dirty, obstructed, or damaged. In still other embodiments of the robot 12, additional contacts may be used to transmit data and information between the robot 12 and docking station 14.

The charging contacts 82 are sized and positioned to reliably and repeatedly contact the corresponding charging contacts on the docking station 14. For example, the charging contacts 82 may be elongated to ensure contact with the docking station charging contacts. The charging contacts 82 can be curved along the same or a similar curvature as the rounded rear side 34. As shown in FIG. 7, the charging contacts 82 can be curved contacts that are disposed horizontally on the rear side 34 of the housing 22, with the positive charging contact 82P spaced apart vertically from the negative charging contact 82N. Other shapes and relative dispositions for the charging contacts 82 are possible.

FIGS. 8-16 illustrate one embodiment of the docking station 14. The docking station 14 includes a housing 120, electrical contacts or charging contacts 122 disposed on the housing 120 that are adapted to mate with the charging contacts 82 on the exterior surface of the robot 12 to charge the battery 80 of the robot (see FIGS. 4 and 7), and at least one transmitter 124 that can transmit at least one encoded beam for detection by the robot 12. In the illustrated embodiment, the docking station 14 comprises multiple transmitters 124 that can transmit at least one signal or encoded beam for detection by the robot 12, and can be configured so that the signals are directed in multiple different directions outwardly from the housing 120, as described further below.

The housing 120 can have a front side 126, a rear side 128, a first lateral side 130, and a second lateral side 132, a top side 134, and a bottom side 136. The front side 126 of the housing 120 can comprise a backstop 138 for the robot 12. The bottom side 136 of the housing 120 can comprise a base on which the docking station 14 rests. The rear side 128 of the housing 120 can be flat and optionally disposed to abut against a wall or other vertical surface. Other shapes and configurations for the housing 120 of the docking station 14 are possible. Optionally, a logo 140 consisting of letters, numbers, characters, geometric shapes or any combination thereof can be provided on the housing 120.

The backstop 138 is generally perpendicular to the ground surface on which the bottom side 136 or base rests, but may have a slight backwards or forwards angle. The backstop 138 can comprise a concave surface of the housing 120 to complement the rounded second end or rear side 34 of the robot 12 that meets the backstop 138 when docked with the docking station 14. Other shapes for the backstop 138 are possible, including shapes that are complementary or non-complementary to the portion of the robot 12 that meets the backstop 138 when docked with the docking station 14.

The bottom side 136 or base of the housing 120 on which the docking station 14 rests can project forwardly of the backstop 138 for stability. In some embodiments, the projecting portion of the bottom side 136 can be ramped or otherwise shaped to help center the robot 12 in the docking station 14.

The charging contacts 122 of the docking station 14 are located on the backstop 138, allowing them to contact corresponding contacts 82 on the second end or rear side 34 of the robot 12 when the robot 12 meets the backstop 138 during docking. Alternatively, the charging contacts 122 can be provided on an extension from the bottom side 136, backstop 138, or other portion of the housing 120, and configured to contact corresponding contacts 82 on the underside 48 of the robot 12.

The docking station 14 can have a printed circuit board assembly (PCBA) 142 comprising the circuitry for supplying a suitable voltage and current to the robot 12 via the charging contacts 122 when the robot 12 is docked. The PCBA 142 takes the input power supplied to the docking station 14 by a power supply connector or socket 144 on the housing 120 and provides a suitable output voltage and current to the robot 12 via the charging contacts 122. The PCBA 142 is enclosed within the housing 120, and may optionally be at least partially supported by a PCBA bracket 146 mounted within the housing 120.

The socket 144 can be provided at the rear side 128 of the housing 120 for connection of the docking station 14 to a household power supply, such as an A/C power outlet 16, via a power cable 150 (shown in phantom line in FIG. 10) which can include the converter 18 for converting the AC voltage into DC voltage (see FIG. 1). The socket 144 can alternatively be located elsewhere on the housing 120, such as on one of the lateral sides 130, 132 of the housing 120.

An indicator light 148 can be provided at the rear side 128 of the housing 120 for providing a visual notification to a user. In one embodiment, the light 148 illuminates when the robot 12 is docked and charging. The light 148 can also communicate a charging mode of the docking station 14. As described in further detail below, the docking station 14 can be operable in a high power charging mode or a low power charging mode. The light 148 can communicate whether the docking station 14 is in the high power charging mode or the low power charging mode, or can indicate when changing between modes. For example, when changing to the low power charging mode, the light 148 can blink, flash, or turn off as a signal that the mode has successfully been changed.

The housing 120 can optionally be provided with cable routing features for routing the power cable 150 along a predesignated path. For example, a cable routing channel 152 can be provided in the rear side 128 of the housing 120 for retaining a length of the power cable 150 therein and routing the power cable 150 from the socket 144 toward one side of the housing 120. The cable routing channel 152 can have multiple branches so that a user select where the power cable 150 is routed. In the embodiment shown, the cable routing channel 152 includes a first branch 154 for routing the power cable 150 toward the first lateral side 130 of the housing 120 and a second branch 156 for routing the power cable 150 toward the second lateral side 132 of the housing 120. Depending on where the A/C power outlet 16 (FIG. 1) or other household power supply is disposed in relation to a desired location of the docking station 14, a user may route the power cable 150 through the first branch 154, the second branch 156, or neither branch. Two possible routes for the power cable 150 are shown in phantom line in FIG. 10, although it is understood that other cable routes are possible.

The bottom side 136 or base can optionally have friction pads 158 to prevent movement of the docking station 14. The friction pads 158 are made of a material having a high coefficient of friction, such as rubber. As shown, two friction pads 158 can be elongated in a docking direction D of the robot 12. A third friction pad 158 can be disposed transversely to the docking direction D.

In the embodiment shown, a positive charging contact 122P and a negative charging contact 122N are utilized to detect a completed circuit when the robot 12 docks with the docking station 14. In other embodiments, a single charging contact 122 or more than two charging contacts 122 may be utilized. An additional charging contact would provide redundancy in the event that one of the other charging contacts becomes dirty, obstructed, or damaged. In still other embodiments of the docking station 14, additional contacts may be used to transmit data and information between the robot 12 and docking station 14.

Figure 8:
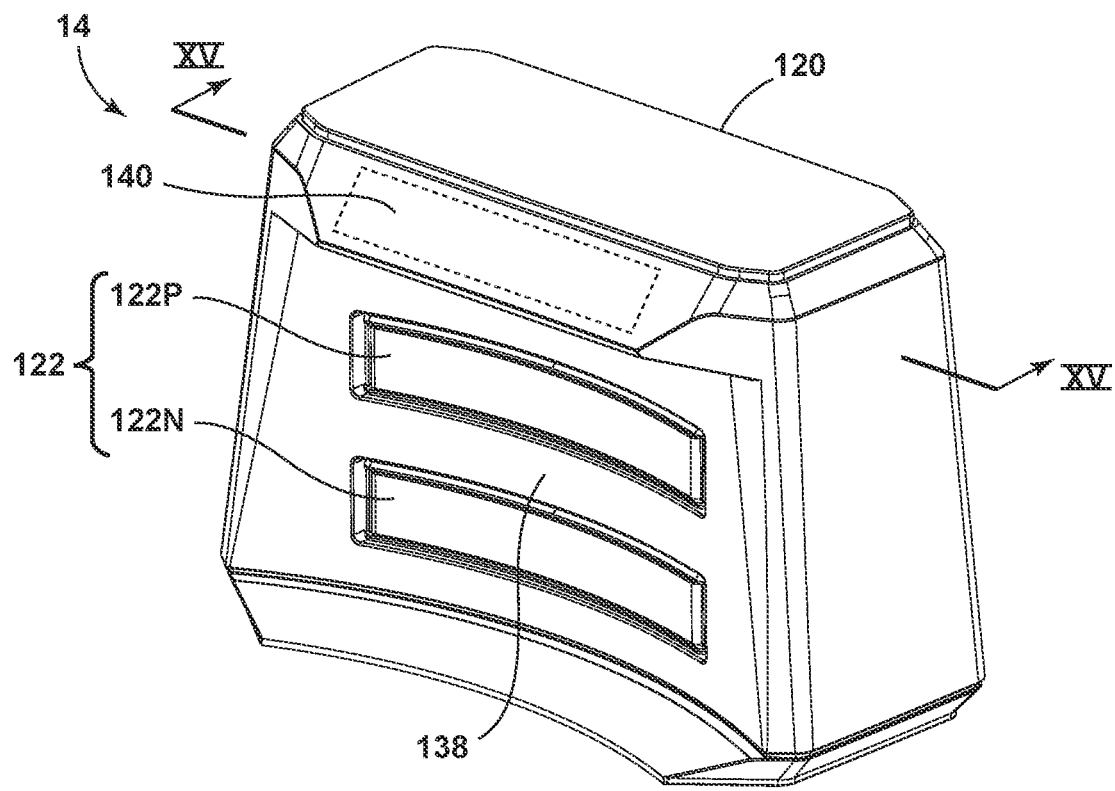
FIG. 8 is a front perspective view of one embodiment of a docking station for the system of FIG. 1.
Figure 9:
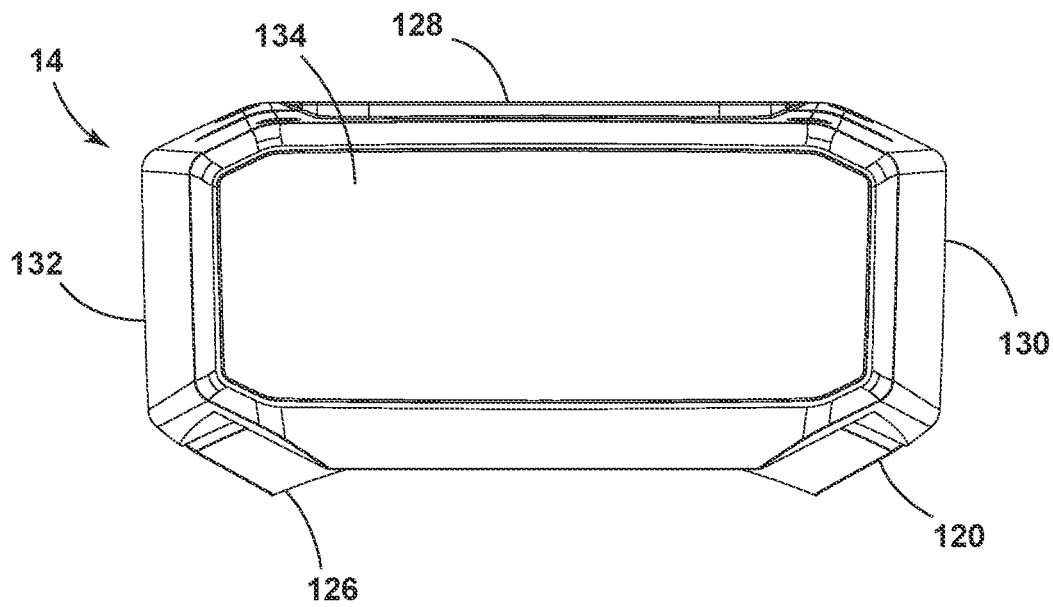
FIG. 9 is a top view of the docking station from FIG. 8.
Figure 10:
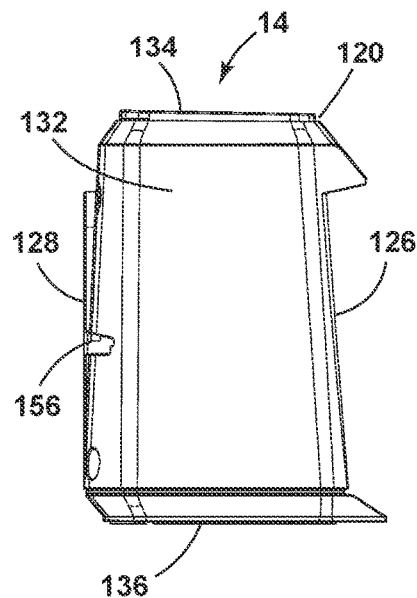
FIG. 10 is a side view of the docking station from FIG. 8.
Figure 11:
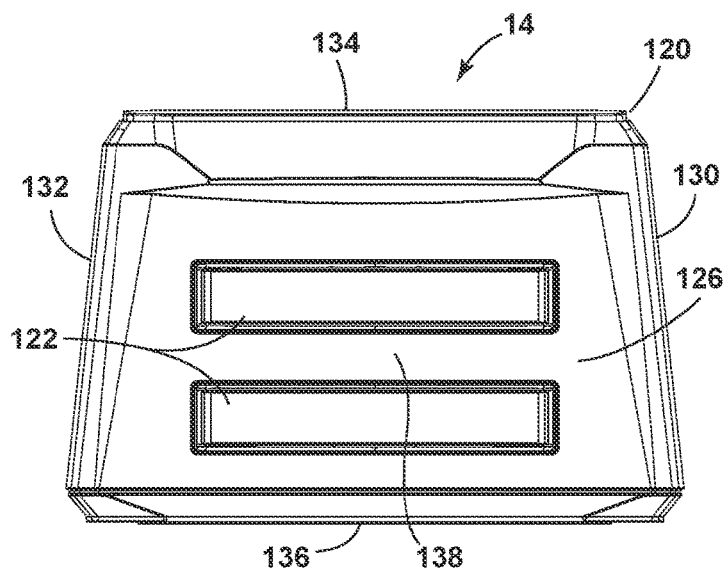
FIG. 11 is a front view of the docking station from FIG. 8.
Figure 12:
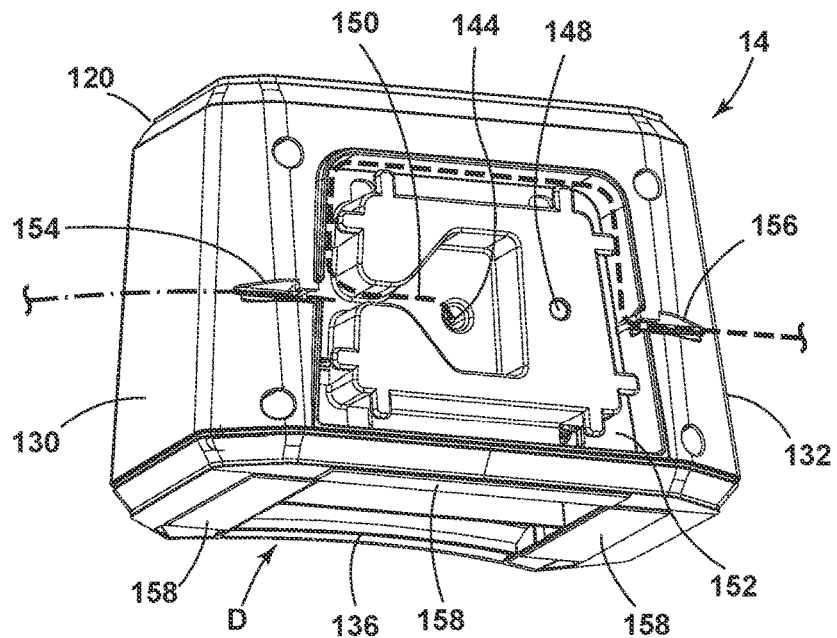
FIG. 12 is a rear perspective view of the docking station from FIG. 8.
Figure 13:
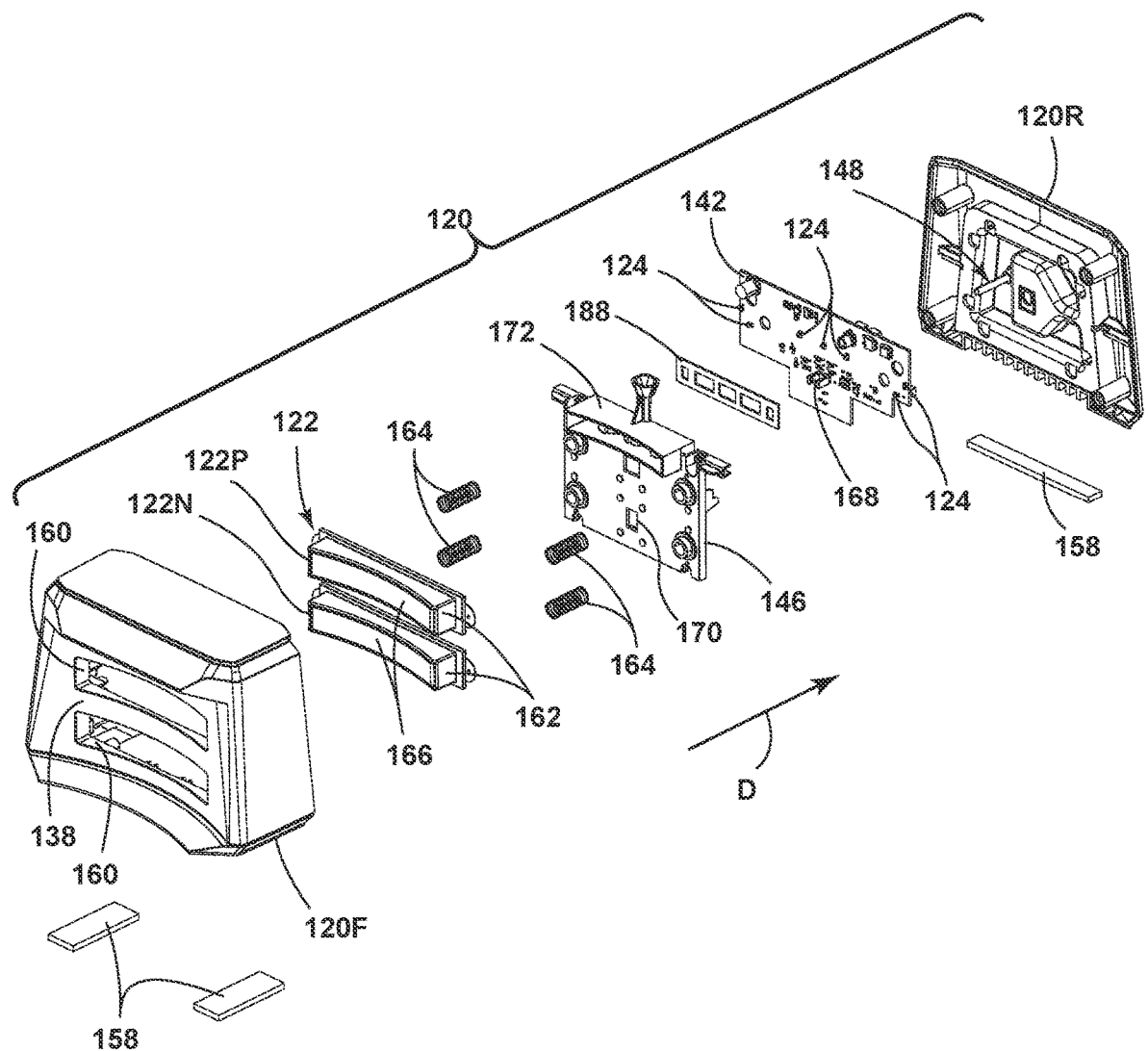
FIG. 13 is an exploded view of the docking station from FIG. 8.

The charging contacts 122 are sized and positioned to reliably and repeatedly contact the corresponding charging contacts 82 on the robot 12. For example, the charging contacts 122 may be elongated to ensure contact with the robot charging contacts 82. The charging contacts 122 can be curved along the same or a similar curvature as the concave backstop 138. As shown in FIGS. 8 and 13, the charging contacts 122 can be curved contacts that are disposed horizontally on the backstop 138 of the housing 120, with the positive charging contact 122P spaced apart vertically from the negative charging contact 122N. Other shapes and relative dispositions for the charging contacts 122 are possible. The charging contacts 122 are electrically conductive, and may be formed from nickel-plated brass, copper alloys or nickel-plated carbon steel. Other electrically conductive materials, metallic or otherwise, are possible.

With reference to FIG. 13, the embodiment shown includes two openings 160 in the backstop 138 through which the charging contacts 122 protrude. The openings 160 can ensure proper alignment and restriction between the charging contacts 122, which can be provided as elongated rails supported by rail brackets 162, as the charging contacts 122 are repeatedly engaged by the robot 12.

The charging contacts 122 may be fixed or compliant. In the embodiment shown, the charging contacts 122 are compliant, and are biased by springs 164 to a neutral position, which can correspond to a condition in which the robot 12 is not docked with the docking station 14. The brackets 162 can support the contacts 122 in alignment with the springs 164. Other elements for resiliently-mounting the charging contacts 122 are possible. By virtue of the compliant or resilient mounting, the charging contacts 122 are urged outwardly away from the backstop 138 so that outer surfaces 166 of the charging contacts 122 protrude through the openings 160 provided in the backstop 138. A force applied to the outer surfaces 166, i.e. the docking of the robot 12 with the docking station 14, causes the charging contacts 122 to recede into the openings 160 and move to a contact position, which can establish a positive electrical contact between the robot's charging contacts 82 and the docking station charging contacts 122.

In the neutral position, the outer surfaces 166 of the charging contacts 122 may be flush with the backstop 138, may protrude slightly in front of the backstop 138, or may be slightly recessed within the backstop 138, depending on the mounting within the housing 22 and the biasing force of the springs 164. In the contact position, the outer surfaces 166 of the charging contacts 122 recede relative to the housing 22 in comparison to the neutral position, but may still be flush with the backstop 138, may protrude slightly in front of the backstop 138, or may be slighted recessed within the backstop 138, depending on the neutral position and the compression of the charging contacts 122.

An activating switch 168 for controlling the supply of power to the charging contacts 122 is provided, and is operable to move between an on and off position. The activating switch cooperates with the PCBA 142 in order to control the flow of power to the contacts 122. When the activating switch is on, power is applied to the charging contacts 122. The activating switch 168 is configured to be actuated, i.e. moved to the on position, when the robot 12 docks with the docking station 14.

In one embodiment, the activating switch 168 can comprise an optical switch mounted to the PCBA 142 that is occluded by one of the spring-loaded charging contacts 122 when depressed to indicate that the robot 12 is present. A portion of one of the charging contacts 122 can travel through a hole 170 on the bracket 146 to occlude the optical switch.

As briefly noted above, the docking station 14 comprises multiple transmitters 124 that can transmit at least one encoded beam for detection by the robot 12. In one example, the transmitters 124 are IR transmitters that irradiate infrared and/or near infrared light. The IR transmitters can transmit an encoded IR beam in a predetermined direction for a predetermined period of time. The transmitters 124 are configured so that the encoded beams are directed in multiple different directions outwardly from the housing 120, as described further below.

In the embodiment shown, the docking station 14 can comprise a plurality of IR transmitters 124 on the PCBA 142 of the docking station 14. The transmitters 124 are electrically connected to and controlled by components of the PCBA 142. In particular, the transmitters 124 are controlled to emit light. The IR transmitters 124 can be infrared light emitting diodes (LEDs). Other embodiments of the IR transmitters 124 are possible. In some embodiments, the IR transmitters 124 operates using infrared or near infrared wavelengths, for example 920-960 nm, alternatively 940 nm.

Figure 14:
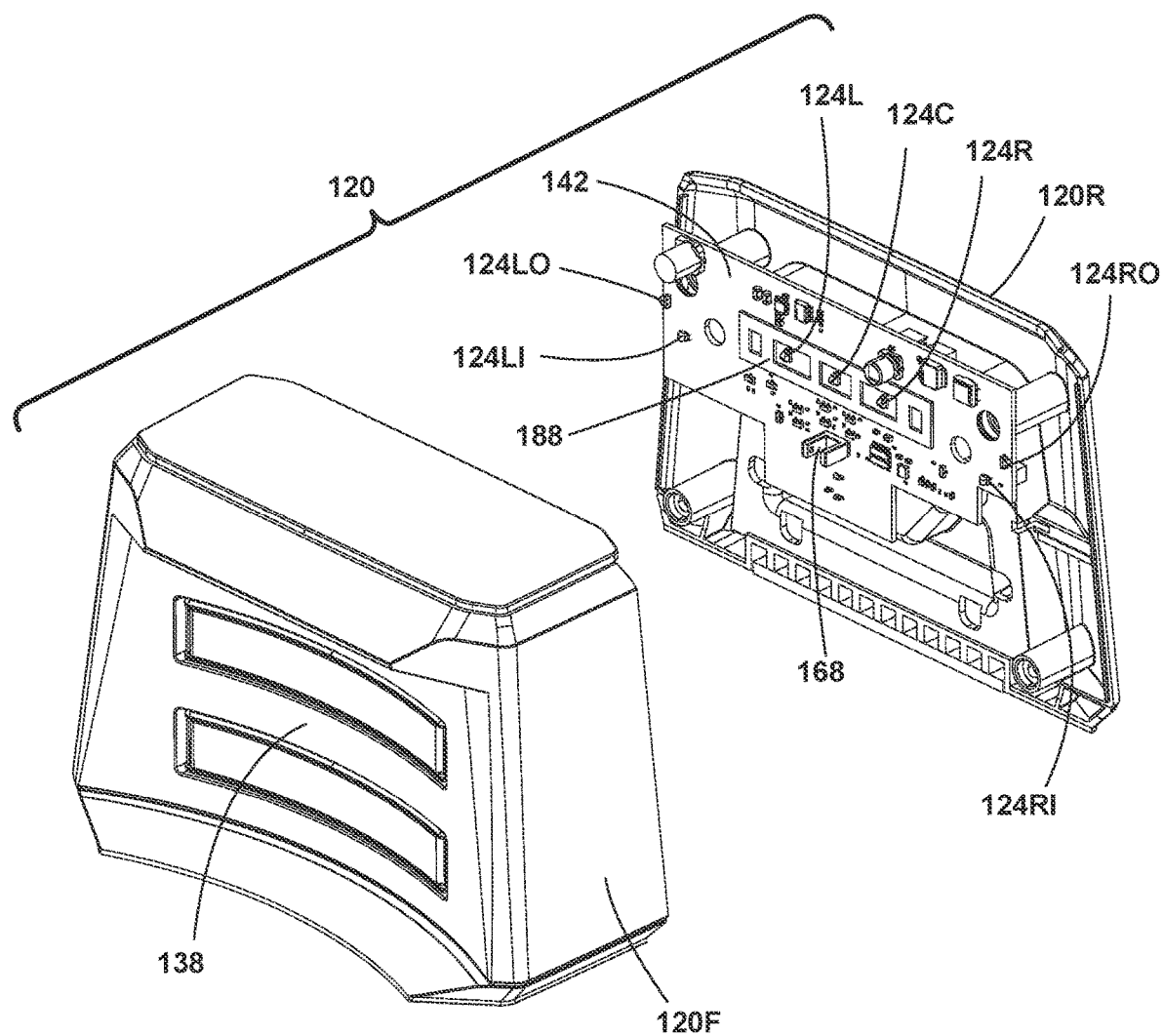
FIG. 14 is a partially exploded view of the docking station from FIG. 8, showing multiple transmitters in one exemplary layout.

FIG. 14 shows one embodiment of a transmitter layout for the docking station 14. Multiple transmitters 124 are provided, including a first or center transmitter 124C, a second or right transmitter 124R, and a third or left transmitter 124L. These transmitters 124C, 124R, 124L transmit signals which can be detected by the robot 12 and used for docking with and/or avoiding the docking station 14, as described in further detail below. Additional transmitters can be provided for transmitting avoidance or keep out signals, which can be used by the robot 12 to avoid the docking station 14. Such transmitters can include a fourth or inboard right side transmitter 124RI, a fifth or outboard right side transmitter 124RO, a sixth or inboard left side transmitter 124LI, and a seventh or outboard left side transmitter 124LO. The outboard side transmitters are provided at or near the outer sides of the PCBA 142 to provide a wide range for the keep out signals.

In at least some embodiments, the medial transmitters 124C, 124R, 124L are configured to emit docking signals, and may be referred to herein as docking signal transmitters, and the lateral transmitters 124RI, 124RO, 124LI, 124LO are configured to emit keep out signals, and may be referred to herein as keep out signal transmitters.

The transmitters 124 are mounted behind a transparent or translucent portion of the housing 120. For example, the housing 120 can comprise a housing front 120F and a housing rear 120R which is coupled to the housing front 120F. The entire housing front 120F can be transparent or translucent for admitting light signals therethrough. Alternatively, the housing front 120F can comprise an opaque portion and one or more transparent or translucent portions aligned with the transmitters 124.

Figure 15:
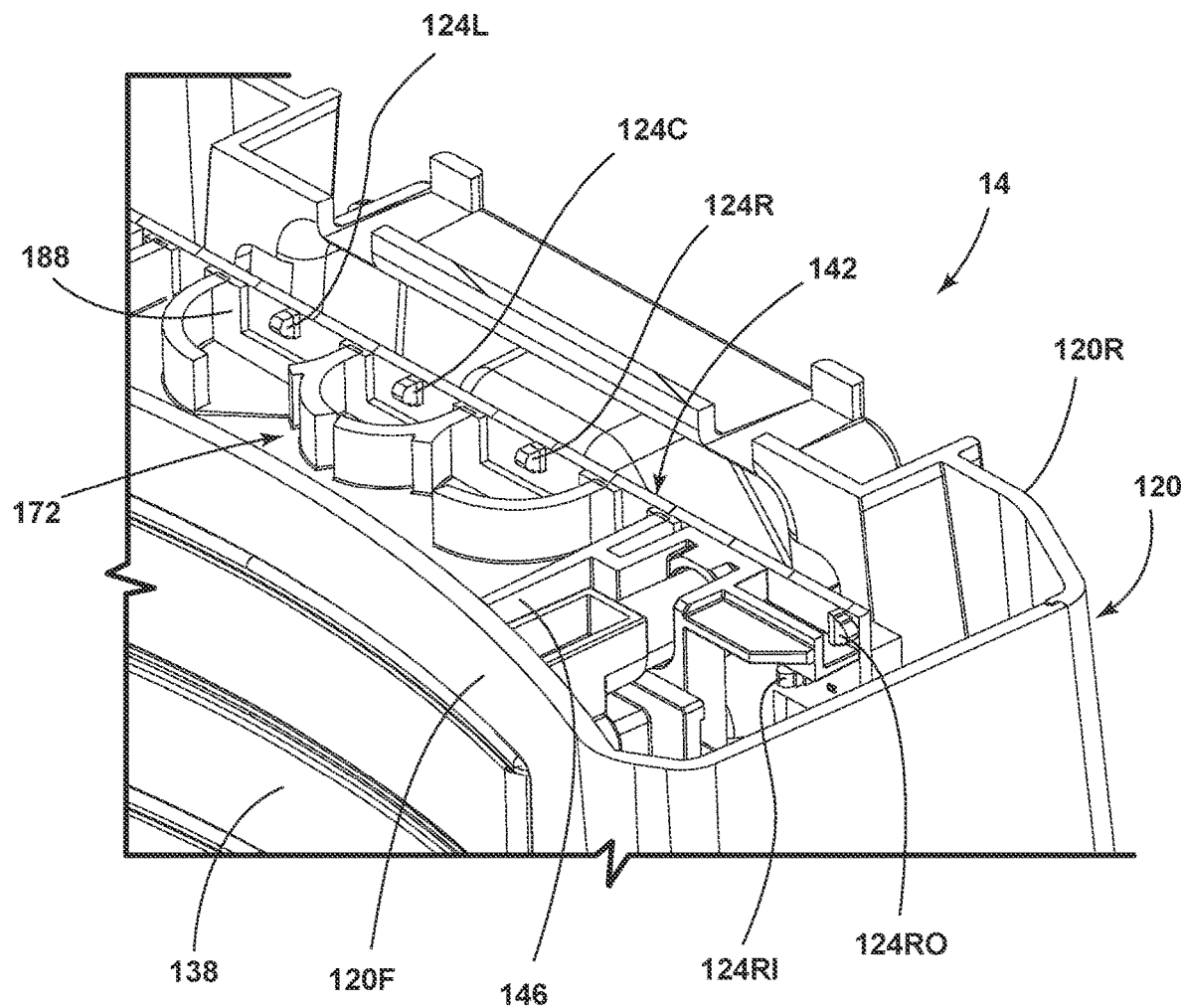
FIG. 15 is a perspective cross-sectional view of the docking station taken through line XV-XV of FIG. 8.

FIG. 15 is a cross-section through the docking station 14, taken at line XV-XV of FIG. 8. An opaque shroud 172 can be provided for one or more of the transmitters 124 to direct the light signals emitted from the transmitters along a desired path, reduce light bleed, and/or to define the transmission zones of the transmitters 124. In the embodiment shown, the shroud 172 encloses the center transmitter 124C, right transmitter 124R, and left transmitter 124L.

The shroud 172 is generally disposed in front of the PCBA 142, with the shroud 172 including individual opaque enclosures for each transmitter 124C, 124R, 124L. The shroud 172 can extend at least partially, or completely, between the PCBA 142 and the housing front 120F or backstop 138. The shroud 172 can optionally be supported by, formed with, or otherwise attached to the PCBA bracket 146 using any suitable manufacturing and/or attachment method.

In one embodiment the shroud 172 can have a first opaque enclosure or shroud section 174C enclosing the center transmitter 124C and defining a first light chamber 176C, a second opaque enclosure or shroud section 174R enclosing the right transmitter 124R and defining a second light chamber 176R, and a third opaque enclosure or shroud section 174L enclosing the left transmitter 124L and defining a third light chamber 176L.

Each shroud section 174C, 174R, 174L encloses one transmitter 124 to prevent unwanted overlap between signals emitted from each the transmitter 124. In at least some embodiments where the transmitters 124 irradiate infrared and/or near infrared light, and the shroud sections 174C, 174R, 174L can be reflective and/or absorbent to infrared and/or near infrared light emitted from the transmitters 124.

Each shroud section 174C, 174R, 174L includes a wall 178C, 178R, 178L, respectively around one transmitter, and an aperture 180C, 180R, 180L, respectively, in the wall through which light from the transmitter is emitted. Each wall 178C, 178R, 178L has a respective internal surface 182C, 182R, 182L that faces the transmitter 124C, 124R, 124L. At least the internal surface 182C, 182R, 182L, and optionally, the entire the wall 178C, 178R, 178L, is opaque to the light emitted from the transmitters 124, and can be reflective to the light emitted from the transmitters 124.

Some light emitted from the transmitters 124C, 124R, 124L will pass directly though the apertures 180C, 180R, 180L. Due to light scattering and the position of the transmitters relative to the walls 178C, 178R, 178L, at least some of the light emitted from the transmitters 124C, 124R, 124L will be reflected. In the embodiment shown, the walls 178C, 178R, 178L can have concave internal surfaces 182C, 182R, 182L that directs reflections back at the transmitter 124C, 124R, 124L. With the concave internal surfaces 182C, 182R, 182L, all bouncing light inside of the each light chamber 176C, 176R, 176L is reflected back inward and trapped in each respective shroud section 174C, 174R, 174L. Light emitted by the transmitter 124 can substantially only pass through the apertures 180C, 180R, 180L with controllable overlap and crisp edges. Other shroud profiles effective at eliminating unwanted reflections are possible.

Figure 16:
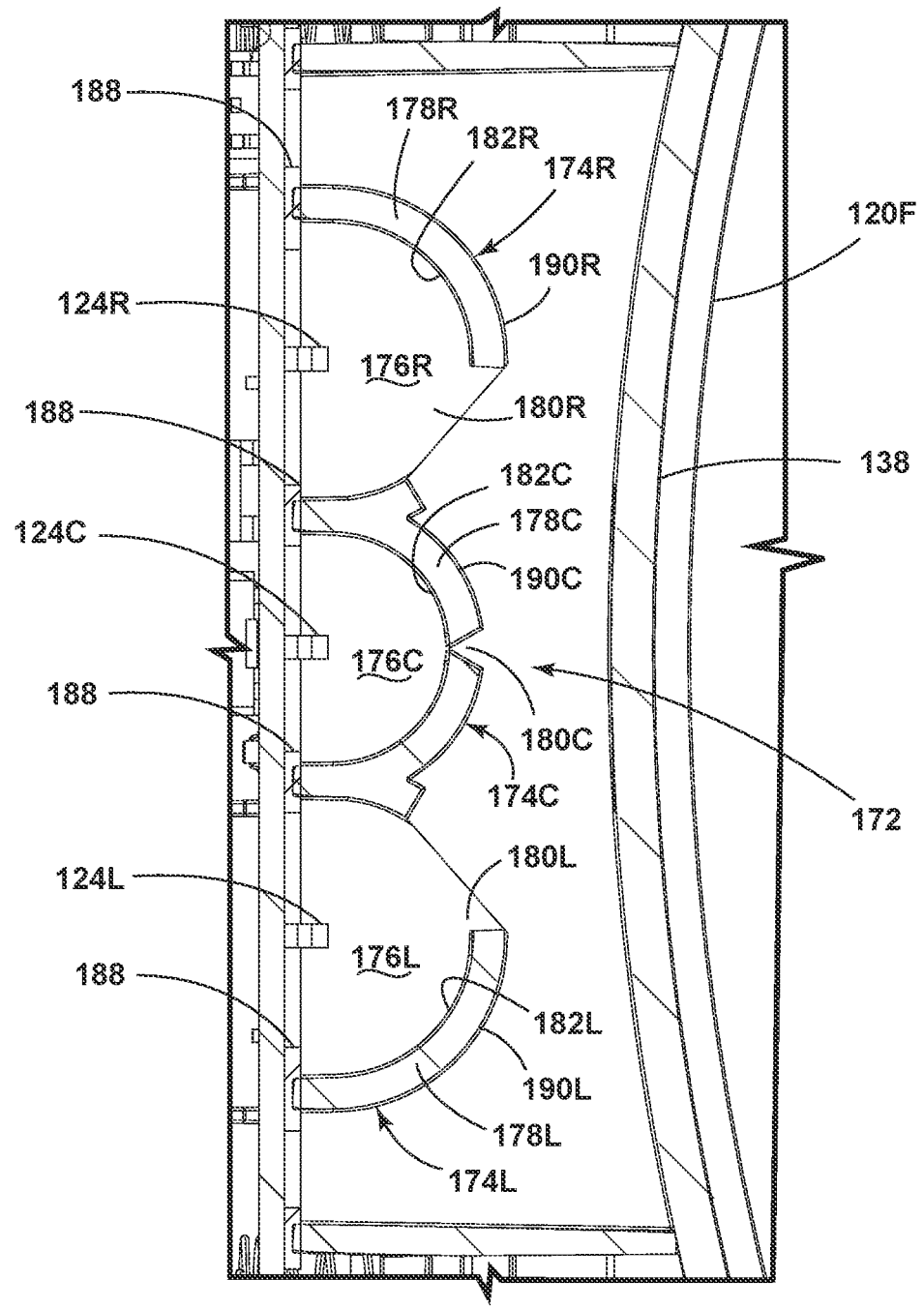
FIG. 16 is a top cross-sectional view of the docking station taken through line XV-XV of FIG. 8.

The walls 178C, 178R, 178L can be rounded or curved to provide the concave internal surfaces 182C, 182R, 182L, and may optionally have convex outer surfaces 190C, 190R, 190L Portions of the walls 178C, 178R, 178L can converge to be shared by more than one shroud section 174C, 174R, 174L. As best seen in FIG. 16, an inboard portion of the wall 178R forming the right shroud section 174R can meet a right-hand portion of the wall 178C forming center shroud section 174C. An inboard portion of the wall 178L forming the left shroud section 174L can meet a left-hand portion of the wall 178C forming center shroud section 174C.

The shroud 172 can fit closely around the transmitters 124 so as to prevent light from escaping or scattering from between the shroud 172 and PCBA 142. Optionally, a seal 188 can be provided between the PCBA 142 and the shroud 172 to eliminate any air gap between the PCBA 142 and the shroud 172. Elimination of any air gap prevents light from the transmitters 124 from leaking out through manufacturing imperfections in the shroud 172 and mixing of the signals from different transmitters 124.

The seal 188 can be opaque at least to the wavelengths of light emitted by the transmitters 124, and can optionally be absorbent to such wavelengths. In this way, only light passing through the openings in the shroud sections will be able to pass into the translucent or transparent housing front 120F.

The seal 188 can comprise apertures aligned with each transmitter 124 to not block light emitted from the transmitters. As best seen in FIG. 16, the seal 188 can have sections between the apertures which abut end portions of each wall 178C, 178R, 178L to seal off each light chamber 176C, 176R, 176L, save for the apertures 180C, 180R, 180L. It is noted that while one seal is shown, more than one seal can be provided, such as by providing individual seals around each shroud section.

Figure 17:
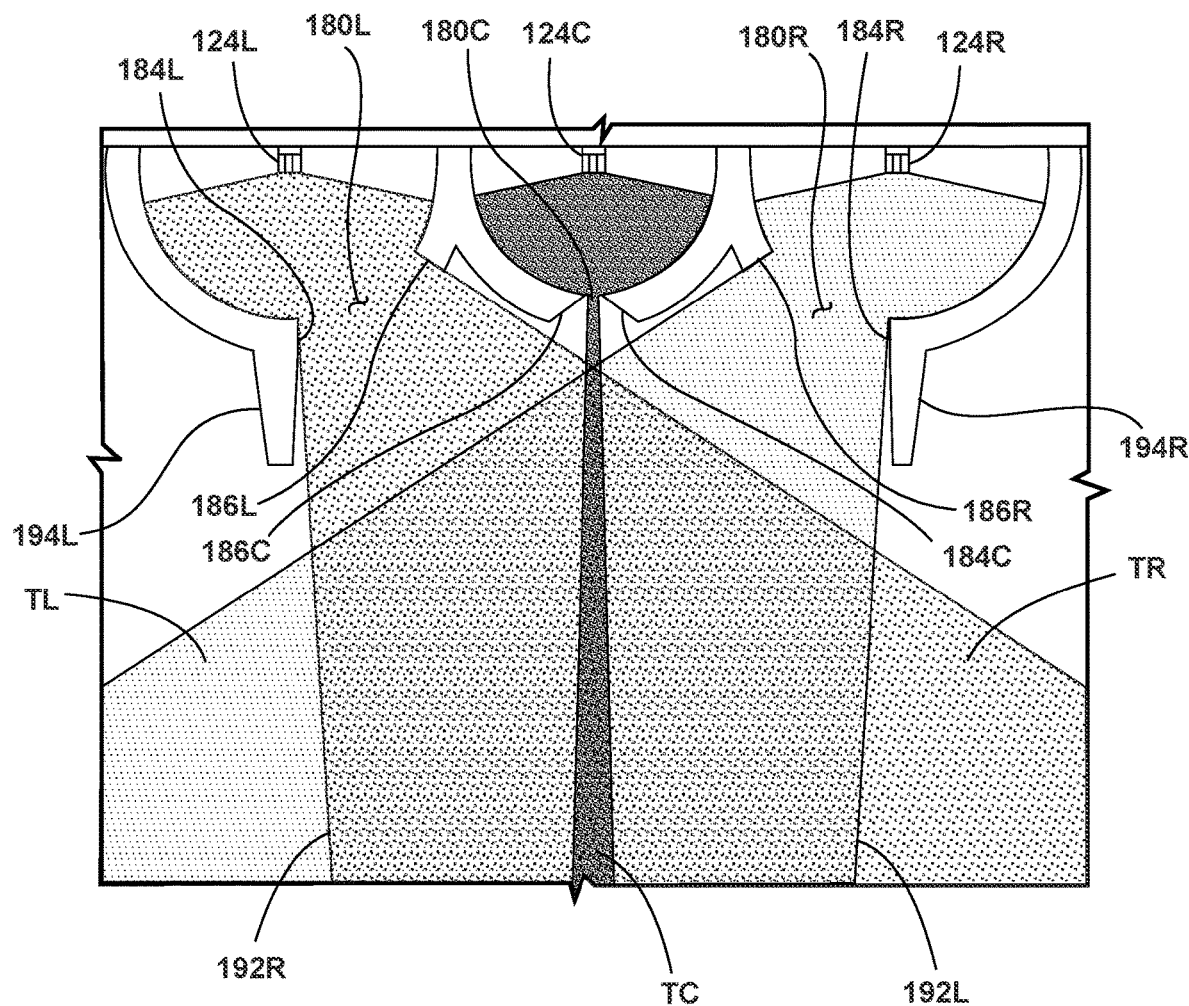
FIG. 17 is an optical simulation of the performance of one embodiment of the transmitters and shroud for the docking station of FIG. 8.

Optionally, as shown in FIG. 17, the shroud 172 can comprise extensions 194R, 194L on the second and third shroud sections 174R, 174L. The extensions 194R, 194L can extend from walls 178R, 178L, adjacent apertures 180R, 180L. In one example, the extensions 194R, 194L can comprise walls extending radially from the rounded or curved walls 178R, 178L. In other embodiments of the shroud 172, for example in the embodiment shown in FIG. 16, the extensions are not present.

FIG. 17 is an optical simulation of the performance of the transmitters 124C, 124R, 124L and shroud 172. Each transmitter 124C, 124R, 124L has a transmission zone, which can optionally overlap each other, in which at least one signal is emitted outwardly from the docking station 14. The first or center transmitter 124C provides a center transmission zone TC, the second or right transmitter 124R provides a left transmission zone TL, and the third or left transmitter 124L provides a right transmission zone TR.

The apertures 180C, 180R, 180L can define the direction of each transmission zone. The central aperture 180C can be in axial alignment with the center transmitter 124C. This provides a signal emitted straight out from the docking station 14 in the center transmission zone TC. The right and left apertures 180R, 180L can be radially offset from their respective transmitters 124R, 124L to provide angled signals in the right and left transmission zones TR, TL. It is noted that due to this radial offset, the outer transmission zones TR, TL cross each other and the center zone TC. Moreover, the right transmitter 124R transmits signals toward the left-hand side of the docking station 14 and the left transmitter 124L transmits signals toward the right-hand side of the docking station 14.

The apertures 180C, 180R, 180L define the angle of each transmission zone. The center aperture 180C can define a narrower zone TC, and the right and left apertures 180R, 180L can define wider zones TR, TL. The center zone TC can be on the order of 16-22 times narrower than versus the outer zones TR, TL. In one example, zone TC can be about 3.4 degrees or less, alternatively about 2.6 degrees or less. In one example, zones TR and TL can be about 57 degrees. However, with the crossing configuration of the zones, the system can tolerate a wider angle. Emitting wider signals from the right and left transmitters 124R, 124L provides the robot 12 with a greater chance of encountering a docking signal emitted from the docking station 14. Emitting a narrower signal from the center of the docking station 14 can be useful for more precise navigation, since the robot 12 can follow the narrow center signal to accurately find the center of the docking station 14. The width of the outer apertures 180R, 180L, and therefore the angle of their respective transmission zones, can be substantially the same as shown herein, or may be different. As discussed in more detail below, the range of signals transmitted within these zones TC, TR, TL can be varied, while the angle remains same.

Each aperture 180C, 180R, 180L is defined by first and second edges of their respective wall 178. The edges are spaced apart to define the width of the aperture 180C, 180R, 180L and the angle of the transmission zones. In the embodiment shown herein, the center aperture 180C is defined by a first edge 184C and a second edge 186C, the right aperture 180R is defined by a first edge 184R and a second edge 186R, and the left aperture 180L is defined by a first edge 184L and a second edge 186L. The first or outer edges 184R, 184L of the outer apertures 180R, 180L can be substantially aligned with the transmitters 124R, 124L to provide a crisp outer edge 192L, 192R for their respective transmission zone TL, TR. In one embodiment, the first or outer edges 184R, 184L of the outer apertures 180R, 180L can be orthogonal to the center of the transmitters 124R, 124L.

Figure 18:
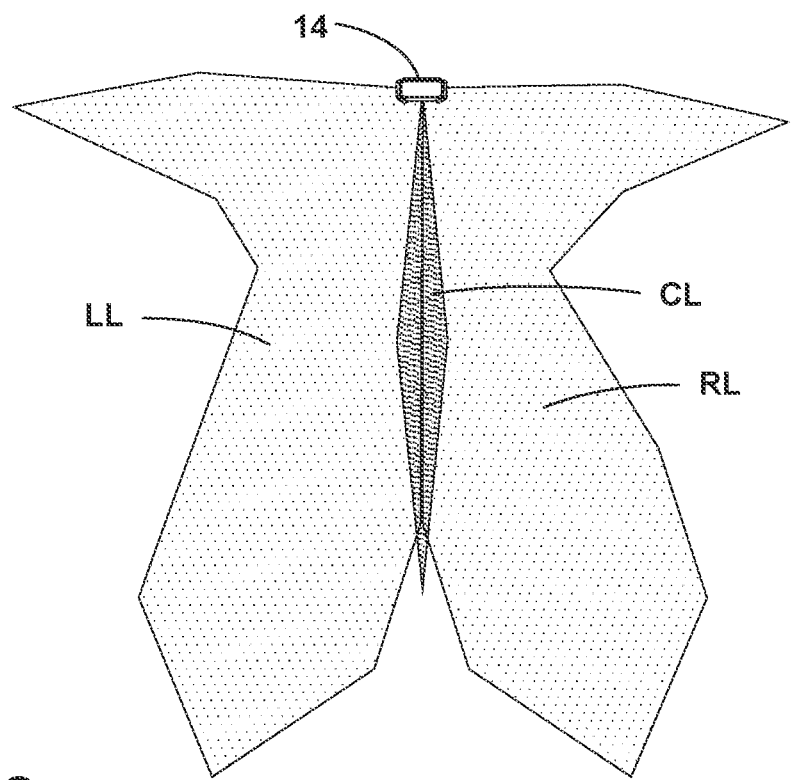
FIG. 18 is a top schematic view of the docking station, showing in one embodiment of a long range signal transmission pattern provided by the docking station.
Figure 19:
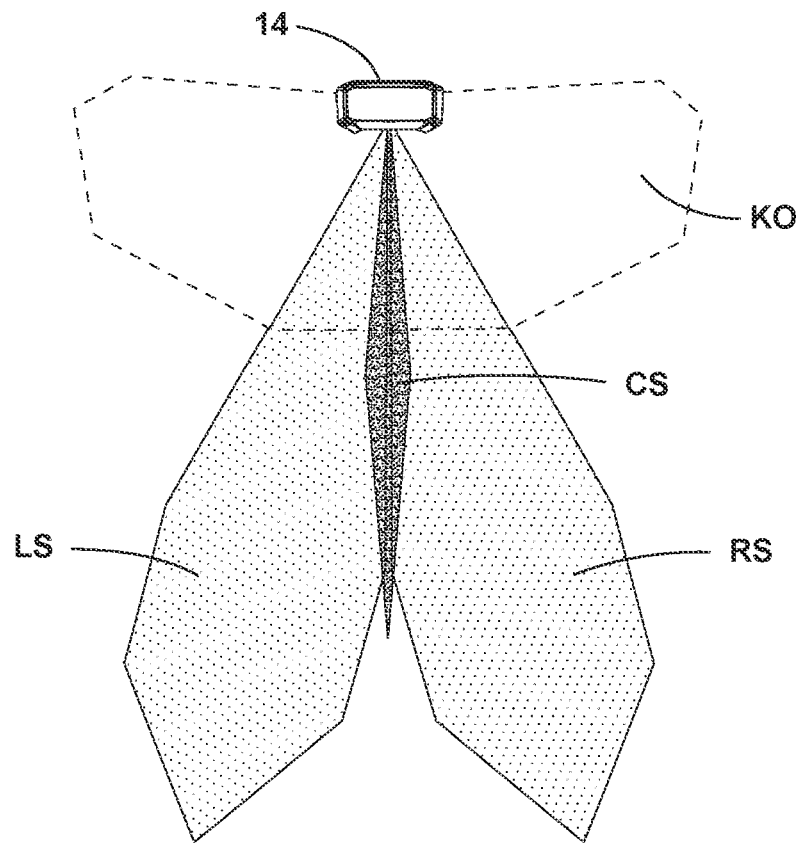
FIG. 19 is a top schematic view of the docking station, showing in one embodiment of a short range signal transmission pattern provided by the docking station.

Referring to FIGS. 18-19, the docking station 14 can transmit a plurality of signals that enable the robot 12 to discover the docking station 14, navigate to and dock with the docking station 14, and/or avoid the docking station 14. In one embodiment, the docking station 14 can transmit at least one long range or long docking signal LL, CL, RL, at least one short range or short docking signal LS, CS, RS, and at least one keep out signal KO. In general, when one or more of the receivers 116 of the robot 12 detects a long or short docking signal from the docking station 14, and if the robot 12 is actively or passively seeking the docking station 14 (for recharging or other docking purposes), it can alter its course toward the docking station 14. When one or more of the receivers 116 of the robot 12 detects the keep out signal KO from the docking station 14, the robot 12 can alter its course, as required, to avoid the docking station 14. Further details of some embodiments of docking methods and docking station avoidance methods are provided below.

The long range or long docking signal LL, CL, RL can be used to discover the docking station 14. Since this signal has a longer range than the short signal, and optionally covers a wider area around the docking station 14, the robot 12 may detect the long docking signal before any other signals from the docking station 14, thereby "discovering" the docking station 14. The robot 12 can follow the long docking signal to the short or keep out signals, which can have a shorter and/or narrow range than the long docking signal.

The short range or short docking signal LS, CS, RS can be used to park the robot 12 at the docking station 14. Since this signal has a shorter range than the long docking signal LL, CL, RL, and optionally covers a narrower area around the docking station 14, the robot 12 can use the short signal for precision maneuvers to line up with and park or dock at the docking station 14.

The long and short docking signals can be emitted predetermined distances away from the docking station 14, which may be predetermined based on the geometric relationship between the charging contacts 82 and TOF sensors 94 on the robot 12, the charging contacts 122 on the docking station 14, and the overall dimensions of the robot 12 and docking station 14. Thus, the robot 12 can detect a long docking signal at a suitable distance away from the docking station 14 to perform the necessary maneuvering to dock without hitting the docking station 14 and to minimizing or eliminate backtracking in order to successfully dock. In one embodiment, a range of one to ten feet (approximately 0.3 to 3.0 m) is suitable for the long docking signal, and a range of one to three feet (approximately 0.3 to 0.9 m), and alternatively 12-18 inches (approximately 0.3 to 0.46 m) is suitable for the short docking signal.

The keep out signal KO can be used by the robot 12 to avoid the docking station 14. When the robot 12 detects the keep out signal from the docking station 14, the robot 12 can alter its course, as required, to avoid the docking station 14. Alternatively, if the robot 12 is actively or passively seeking the docking station 14 (for recharging or other docking purposes), it can alter its course to increase the probability of finding the long and short range docking signals.

The keep out signal KO can have a shorter range than the long and short docking signals so that the robot 12 can clean closely to the docking station 14, but still provide sufficient clearance around the docking station 14. The keep out signal KO can optionally have a wider range than the short docking signals in order to cover more area around the docking station 14. The keep out signal range can extend at least beyond the front and sides of the docking station 14, to up to and beyond several feet from the docking station 14, depending on the application. In one embodiment, a range of 12-18 inches (approximately 0.3 to 0.46 m) provides sufficient room for the robot 12 to maneuver to avoid the docking station 14, while allowing the robot 12 to clean closely to the docking station 14.

The signals can be provided by at least one IR beam from at least one of the IR transmitters 124 of the docking station 14. In one embodiment, the signals are provided by multiple IR beams from multiple IR transmitters 124 of the docking station 14. Generally, each IR beam is coded. The encoding method and binary codes for each IR beam are selected such that the robot 12 can detect the presence of each beam and distinguish between the beams, even if the robot 12 detects multiple beams from the docking station 14 at the same time. Other signal types and encoding methods are possible.

Figure 20:
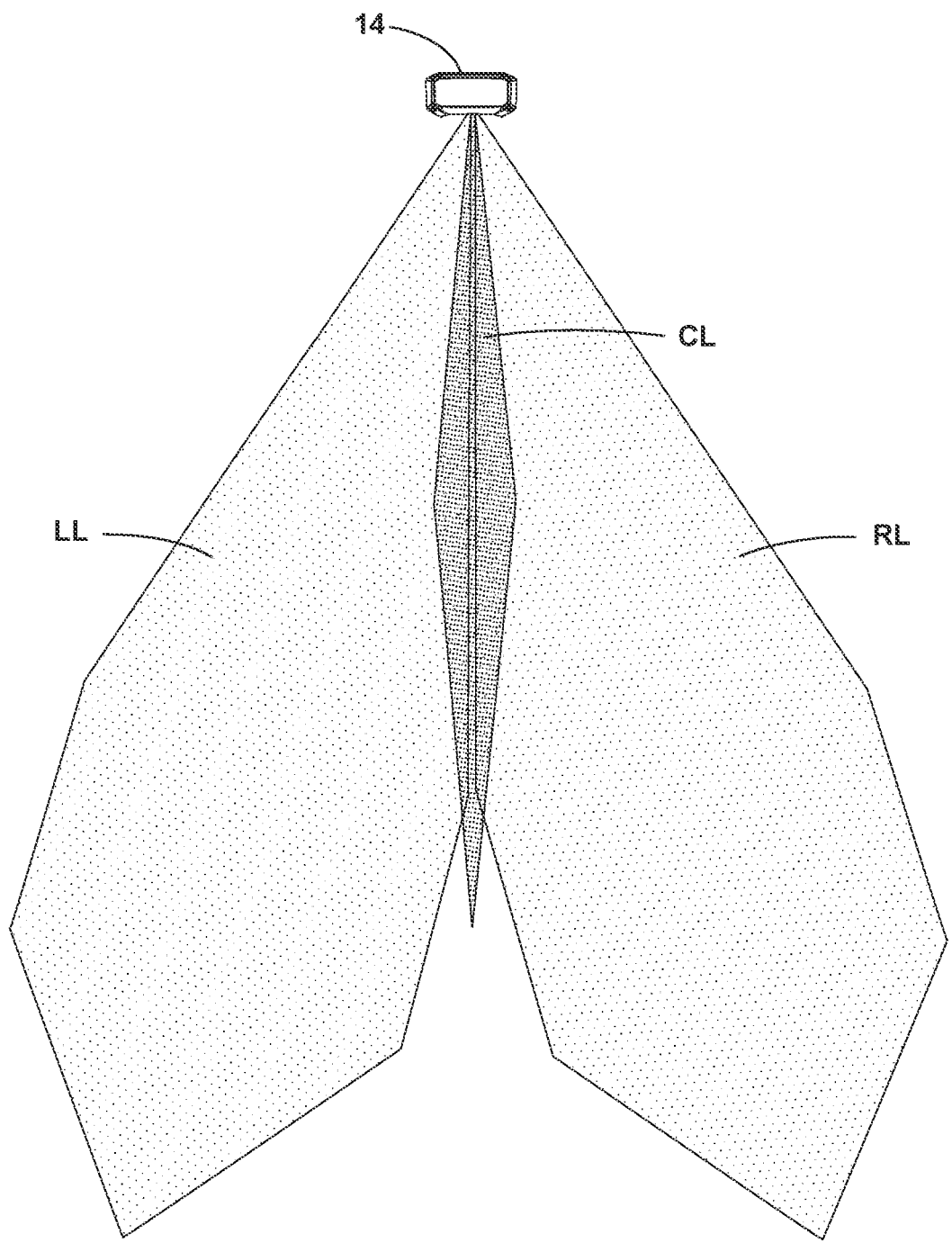
FIG. 20 is a top schematic view of the docking station, showing in another embodiment of a long range signal transmission pattern provided by the docking station.

Referring to FIG. 18, the long range signals LL, CL, RL can be provided by multiple beams from multiple transmitters 124, and may cover the sides and front of the docking station 14. Alternatively, the long range signals LL, CL, RL can cover the front of the docking station 14 as shown in FIG. 20.

In the embodiment shown, the left long range signal LL can be transmitted from the right transmitter 124R within the left transmission zone TL, the center long range signal CL can be transmitted from the center transmitter 124CR within the left transmission zone TL outwardly from the center of the docking station, and the right long range signal RL can be transmitted from the left transmitter 124L within the right transmission zone TR. To provide the coverage pattern shown in FIG. 18, the left long range signal LL can additionally be emitted from the left side transmitters 124LI, 124LO. The right long range signal RL can additionally be emitted from the right side transmitters 124RI, 124RO.

Referring to FIG. 19, in the embodiment shown, the left short range signal LS can be transmitted from the right transmitter 124R within the left transmission zone TL, the center short range signal CS can be transmitted from the center transmitter 124CR within the left transmission zone TL outwardly from the center of the docking station, and the right short range signal RS can be transmitted from the left transmitter 124L within the right transmission zone TR.

A least some of the transmitters 124 alternate between long and short range signals. For example, the signals can be alternated by switching the applied voltage level to the IR LEDs. The middle or medial transmitters 124C, 124R, 124L can alternate between long and short range modes to cyclically provide the long range signals LL, CL, RL and the short range signals LS, CS, RS. The cycle times for each transmitter 124C, 124R, 124L may be the same or different, i.e. the center transmitter 124C may have a duty cycle that is the same as or different from the outer transmitters 124R, 124L.

Referring to FIG. 19. The keep out signal KO can be provided by multiple beams from multiple transmitters 124, and may cover the sides and front of the docking station 14. In the embodiment shown, the keep out signal KO can be transmitted from the side transmitters 124LO, 124LI, 124RO, 124RI towards the sides and front of the docking station 14.

Whenever a measurable level of IR radiation from a keep out signal KO is detected by one of the receivers 116 of the robot 12, the robot's docking station avoidance behavior can be triggered. In one embodiment, the robot 12 may execute one or more predetermined maneuvers, such as a combination of forward driving and turns, until the keep out signal KO is no longer detected by any of the receivers 116, i.e. until IR radiation from the keep out signal KO falls below a detectable level. The robot 12 can then resume cleaning.

Because of potential interference from sunlight and other IR sources, both the TOF sensors 94 of the robot 12 and the transmitters 124 of the docking station 14 operate at the same frequency. The TOF sensors 94 therefore blind the robot 12 to the long docking signals, short docking signals, and keep out signals. While counterintuitive to effective navigation, in some embodiments, the robot 12 can selectively turn off the TOF sensors 94 when docking with or avoiding the docking station 14. At such times, the robot 12 relies upon the passive IR receivers 116 and signals from the docking station 14 to navigate.

Figures 21, 22:
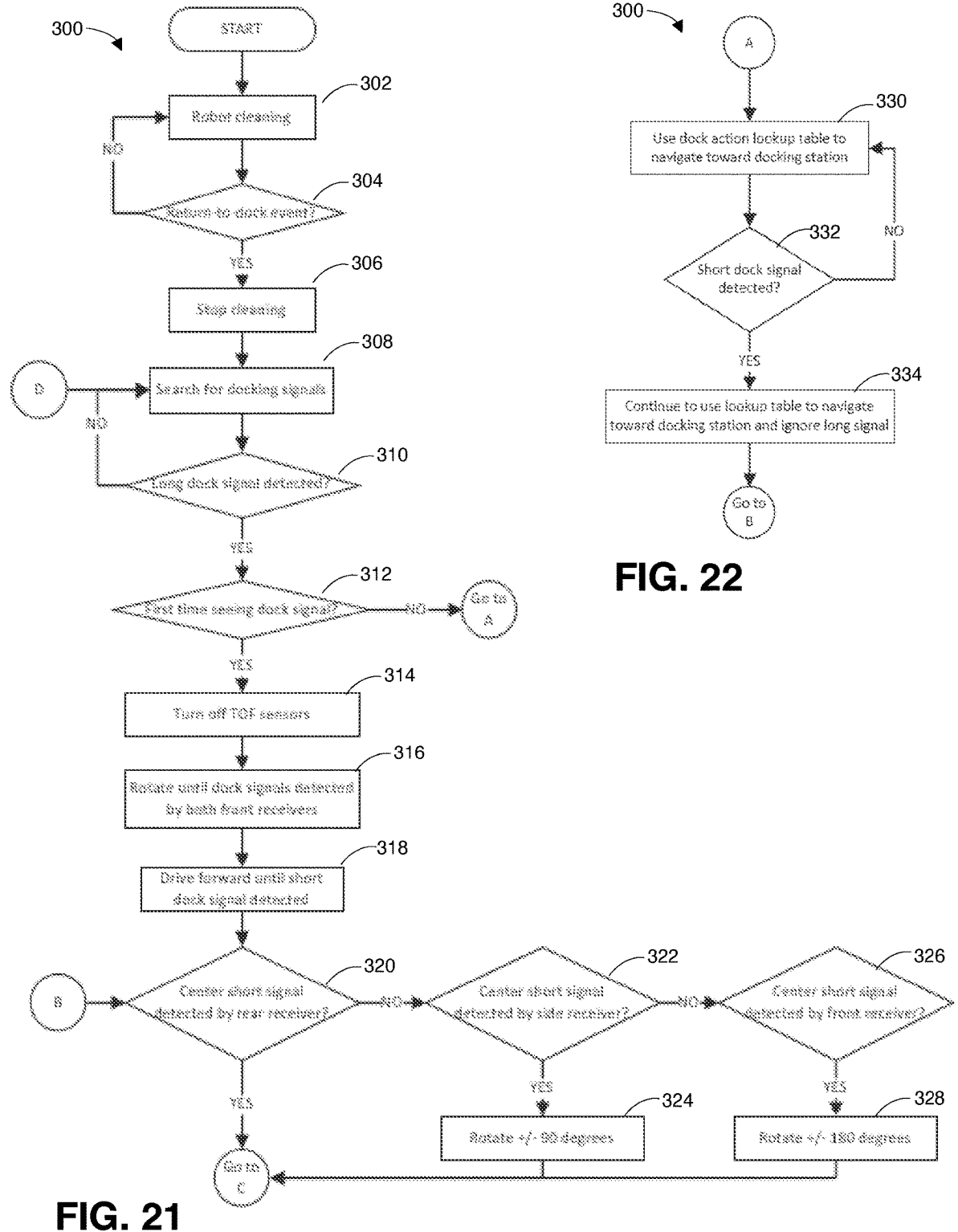
FIG. 21 is a flow chart showing one portion of a method for docking a robot with a docking station.
FIG. 22 is a flow chart showing another portion of the method from FIG. 21.
Figure 23:
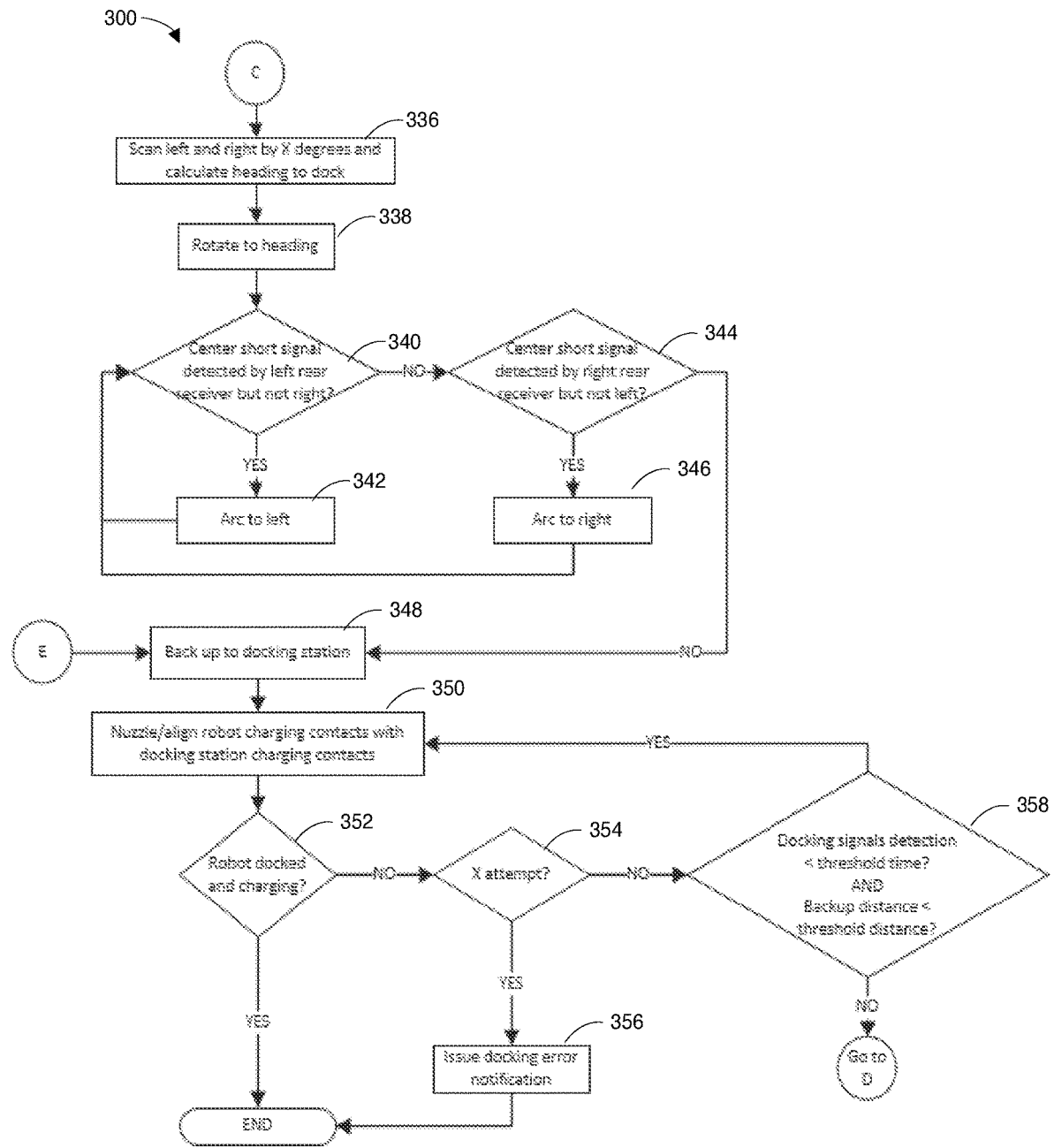
FIG. 23 is a flow chart showing yet another portion of the method from FIG. 21.

FIGS. 21-23 are a flow charts showing one embodiment of a method 300 for docking the robot 12 at the docking station 14. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

At step 302, the robot is cleaning During cleaning, the vacuum motor 50 and/or brush motor 60 may be activated.

At step 304, the robot 12 checks if there has been a return-to-dock event. A return-to-dock event is any event that causes the robot 12 to seek the docking station 14. Examples of return-to-dock events include, but are not limited to, the battery being below a predetermined level, or that a user has commanded the robot 12 to dock (e.g. pressed a dock or home button on the robot 12 or on a mobile device). Where the docking station 14 is to automatically empty the collection bin 46 and/or automatically fill a supply tank, the return-to-dock event can be a threshold level within the bin or tank.

In one embodiment, while the robot 12 performs a cleaning operation, the controller 30 continuously or intermittently monitors whether a residual power level of the battery 80 is below a threshold value. For example, the controller 30 may monitor the voltage of the battery 80, and determine if a voltage of the battery 80 is less than a predetermined voltage. If affirmative, the controller 30 registers a return-to-dock event, and the robot 12 may automatically return to the docking station 14 to recharge the battery 80. For example, if a voltage of the battery 80 is less than a predetermined voltage, the robot 12 will automatically return to the docking station 14. The user can also input a command to the robot 12 to return to the docking station 14, for example by inputting a command via the user interface 84 of the robot 12 or inputting a command via a smartphone, tablet, or other remote device.

If no return-to-dock event has occurred, the robot 12 continues cleaning. If a return-to-dock event has occurred, the robot 12 can stop cleaning at step 306 and begin searching for docking signals LL, CL, RL step 308. Stopping cleaning may include turning off the vacuum motor 50 and/or the brush motor 60.

At step 308, the robot 12 stops cleaning at step 306 and begins searching for signals from the docking station 14. In one embodiment, the robot 12 can use a random movement behavior while searching, and the robot 12 can move randomly about the floor surface. If, during the random movement, a wall is detected, input from the wall following sensor 104 can be used to control the robot 12 to follow near along the wall without contacting the wall. This can, for example, lead the robot 12 around the perimeter of a room and may allow the robot to go through rooms more quickly as compared with random movement. In other embodiments, the robot 12 can solely use random movement behavior while searching.

The robot 12 searches until a long docking signal LL, CL, RL is detected at step 310. It is noted that, rather than stopping cleaning after the return-to-dock event, the robot 12 may continue cleaning until a long docking signal is detected.

At step 312, once a long docking signal LL, CL, RL is detected, the controller 30 can determine if this is the first time seeing the docking signal. This may comprise determining if a particular receiver 116 has seen a particular docking signal or combination of docking signals, or if a particular combination of receivers 116 has seen a particular docking signal or combination of docking signals.

If the robot 12 has not seen the detected docking signal before, the method 300 proceeds to step 314, and the TOF sensors 94 can be turned off. As noted above, because of potential interference from sunlight and other IR sources, both the TOF sensors 94 and the docking station transmitters 124 operate at the same frequency. While turning off the TOF sensors 94 is counterintuitive because they are used for navigation, if the TOF sensors 94 stay on, the robot 12 is essentially blinded to the docking station's signals, and may crash into the docking station 14. Instead of using the TOF sensors 94 to navigate, once the robot 12 is in range of the docking station signals, the robot 12 relies upon the passive IR receivers 116. With receivers 116 covering the front, sides, and rear of the robot 12 (see FIG. 6), by tracking which receiver 116 detects a signal from a particular transmitter 124, the robot 12 can determine its location relative to the docking station 14 with accuracy.

At step 316, the robot 12 rotates until at least one long docking signal LL, CL, RL is detected by both center receivers 116CR, 116CL. The robot 12 can perform a zero-radius turn on the spot where the long docking signal was detected at step 310. A zero-radius turn can be performed by operating one drive wheel 64 (FIG. 3) in the forward direction and the other drive wheel 64 in the reverse direction. The robot 12 may turn left or right, depending on whether the long docking signal was detected on the right or left side of the robot 12. Once at least one long docking signal is detected by both center receivers 116CR, 116CL, the robot 12 stops rotating.

Next, at step 318, the robot 12 drives forward until at least one short docking signal LS, CS, RS is detected. The robot 12 next determines where its charging contacts 82 are approximately positioned relative to the docking station 14 and, if necessary, performs a suitable maneuver to position the charging contacts 82 toward the docking station 14. The relative position of the charging contacts 82 can be approximated by determined which receiver 116 detects the center short docking signal CS from the docking station 14.

In the embodiment shown, the controller 30 determines whether the center short docking signal CS is detected by one of the rear receivers 116RR, 116RL at step 320, and if so, the method proceeds to step 336 shown in FIG. 23. If not, the controller 30 determines whether the center short docking signal CS is detected by one of the side receivers 116SR, 116SL at step 322, and if so, rotates 90 degrees, or substantially 90 degrees, to position the robot's charging contacts 82 toward the docking station 14 at step 324. For example, if the center short docking signal CS is detected by the right side receiver 116SR, the robot 12 turns left and if the center short docking signal CS is detected by the left side receiver 116SL, the robot 12 turns right. In either case, the robot 12 can perform a zero-radius turn on the spot.

If not detected by either side receiver 116SR, 116SL, the controller 30 determines whether the center short docking signal CS is detected by one of the front receivers 116CR, 116CL at step 326 and if so, rotates 180 degrees, or substantially 180 degrees, to position the robot's charging contacts 82 toward the docking station 14 at step 328. For example, if the center short docking signal CS is detected by the center right receiver 116CR, the robot 12 turns left and if the center short docking signal CS is detected by the center left receiver 116CL, the robot 12 turns right. In either case, the robot 12 can perform a zero-radius turn on the spot. If the center short docking signal CS is not detected by any of the receivers after step 326, the robot 12 can drive out and begin searching for a long docking signal again, returning to step 308

Once the center short docking signal CS is detected and the robot's charging contacts 82 are positioned toward the docking station 14, the method proceeds to step 336, and the robot 12 performs a scan to calculate a heading to the docking station 14. The calculated heading to the docking station 14 can be a position at which the robot is substantially aligned with the docking station 14, so that the robot 12 can drive in reverse to mate with the docking station 14, and a position at which the robot 12 can exit the docking station 14 upon the start of a schedule cleaning or after charging. Performing the scan can comprise rotating left and right a predetermined angle from the robot's current position, such as rotating ±90 degrees, alternatively rotating ±45 degrees, alternatively rotating ±20 degrees. The robot 12 can perform a zero-radius turn for the scan.

Once the heading is calculated, the robot 12 rotates to the heading at step 338. Next, the robot 12 makes a more precise determination of where its charging contacts 82 are positioned relative to the docking station 14 and, if necessary, performs a suitable maneuver to line up the charging contacts 82 with the docking station 14. The relative position of the charging contacts 82 can be more precisely determined which rear receiver 116RR, 116RL detects the center short docking signal CS from the docking station 14.

In the embodiment shown, the controller 30 determines whether the center short docking signal CS is detected by the left rear receiver 116RL and not the right rear receiver 116RR at step 340, and if so, the method proceeds to step 342 where the robot 12 arcs to the left. If not, the controller 30 determines whether the center short docking signal CS is detected by the right rear receiver 116RR and not the left rear receiver 116RL at step 344, and if so, the method proceeds to step 346 where the robot 12 arcs to the right. To arc left or right, the robot 12 can drive backwards by operating one drive wheel 64 (FIG. 3) in the reverse direction at a first speed and the other drive wheel 64 in the reverse direction at a second speed that is different than the first speed, resulting in a greater-than-zero radius turn. Depending on whether the robot 12 is arcing left or right, the second speed can be greater than or less than the first speed in order to move the robot 12 toward the left or toward the right. These steps 340-346 are cycled through until the center short docking signal CS is detected by both rear receivers 116RR, 116RL. Once both rear receivers 116RR, 116RL detect the center short docking signal CS, the method proceeds to step 348.

At step 348, the robot 12 backs up to the docking station 14. The robot 12 can move straight back to the docking station 14 from its current position. For example, the robot 12 can operate both drive wheels 64 (FIG. 3) in the reverse direction. The robot 12 can move in reverse until the robot's charging contacts 82 make a positive electrical contact with the docking station charging contacts 122.

At step 350, once the robot 12 reaches the docking station 14, the robot 12 performs a back-and-forth rotation, or nuzzle, to determine when it is "square" to the docking station 14, i.e. when the charging contacts 82, 122 are aligned. To perform the nuzzle, the robot 12 rotates in one direction until it reaches a first position in which its charging contacts 82 are not touching the dock's charging contacts 122. At this point, the robot 12 registers that charging is lost. The robot 12 then rotates in the opposite direction until it reaches a second position in which its charging contacts 82 are again not touching the dock's charging contacts 122. At this point, the robot 12 again registers that charging is lost. The controller 30 then determines a midpoint position between the first and second positions. The midpoint position can be a position at or near the middle of the first and second positions, or equidistant from each of the first and second positions. Finally, the robot 12 rotates to the midpoint position to complete step 350.

At step 352, the controller 30 determines whether the robot 12 had successfully docked and the battery 80 is charging. If so, docking is complete and the method 300 ends. If not, at step 354 the controller 30 determines whether a predetermined number X of docking attempts have been made without success. In one example, the predetermined number X can be three attempts. If the predetermined number X of docking attempts have been made without success, the method proceeds to step 356 and the robot 12 issues a docking error notification. The docking error notification can be a visual notification on the display 86 or elsewhere on the robot 12, or an audible notification issued from the robot 12. Additionally or alternatively, the docking station 14 can issues a docking error notification.

If fewer than the predetermined number X of docking attempts have been made, the method proceeds to step 358 where the controller 30 determines whether any docking signals have been detected within a threshold time and whether the backup distance the robot traveled at step 348 was less than a threshold distance. In one embodiment, the threshold time can be 10 to 20 seconds, and the threshold distance can be 500 mm or less. If both the time and distance values are within their respective threshold, the method returns to step 350 and the robot 12 retries the nuzzle maneuver in an effort to establish charging. If either threshold is met or exceed, the method returns to step 308 (FIG. 21) and begins searching again for docking signals.

In some embodiments, the robot 12 can use data from previous dockings to navigate to the docking station 14, without relying on the docking signals. This can shorten the amount of time that the robot 12 takes to successfully dock, and may conserve battery life. Returning to FIG. 21, if, at step 312, the robot 12 has seen the detected docking signal before, the method 300 can proceed to step 330, shown in FIG. 22, and use a dock action lookup table to navigate toward the docking station 14. The dock action lookup table can be an array or matrix of data pairing the robot's receivers 116 and the docking signals previously detected by the receiver 116, and the values returned are actions to take given the combination of signals detected and receiver or receivers which detected the signals. Data populating the lookup table can be historical data saved from one or more previous dockings. The dock action lookup table can be stored in the memory 68 of the robot 12 and accessed by the controller 30.

The robot 12 navigates using the dock action lookup table until a short docking signal LS, CS, RS is detected at step 332. The TOF sensors 94 can be turned off before or during step 332. Once a short docking signal is detected, the controller 30 continues to use the dock action lookup table to navigate toward the docking station 14 at step 334. The method can then proceed to step 320 (FIG. 21) where the robot 12 determines which receiver 116 detects the center short docking signal CS and the method 300 can continue as previously described.

Figure 29:
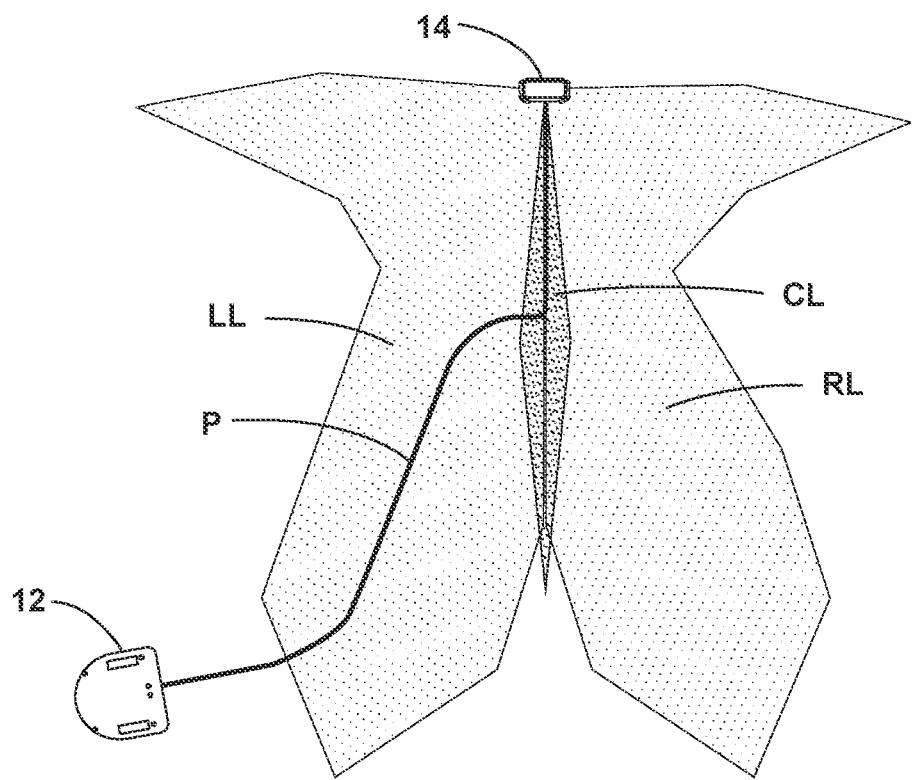
FIGS. 29-34 are schematic illustrations of a robot performing the docking method of FIGS. 21-23.
Figure 30:
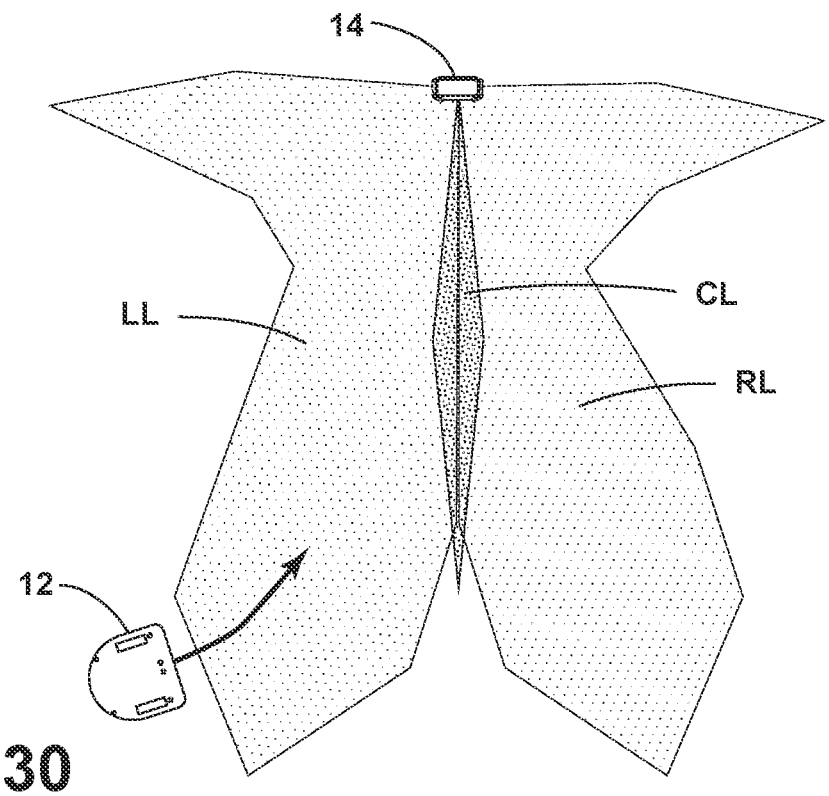
Figure 31:
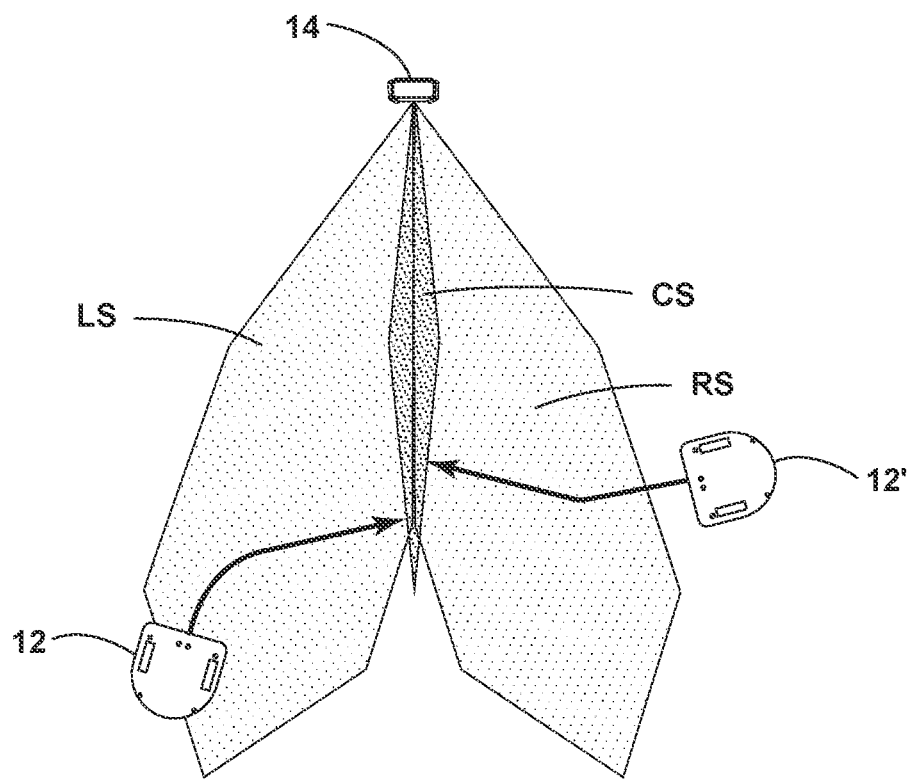
Figure 32:
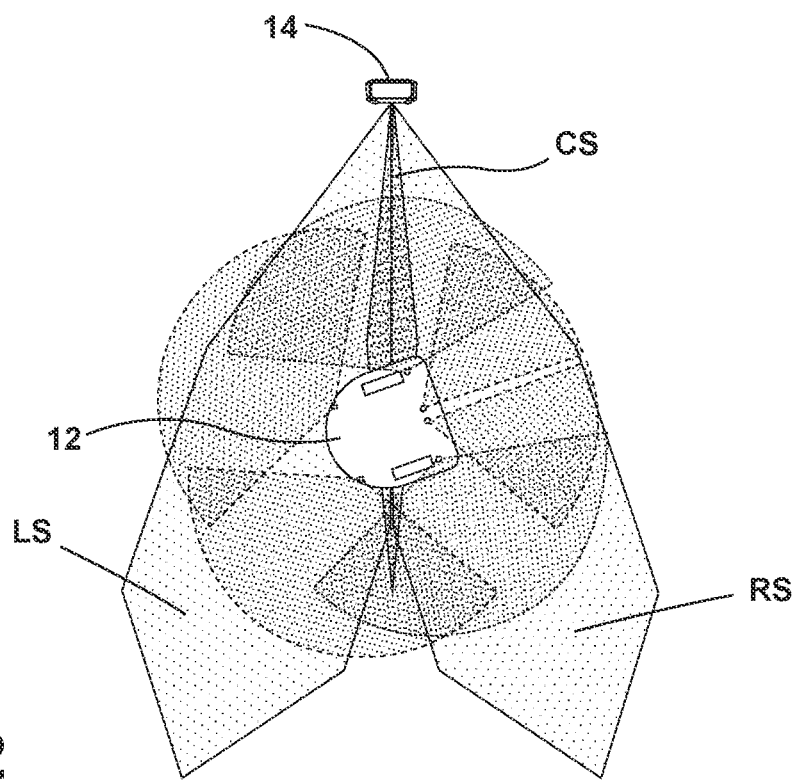
Figure 33:
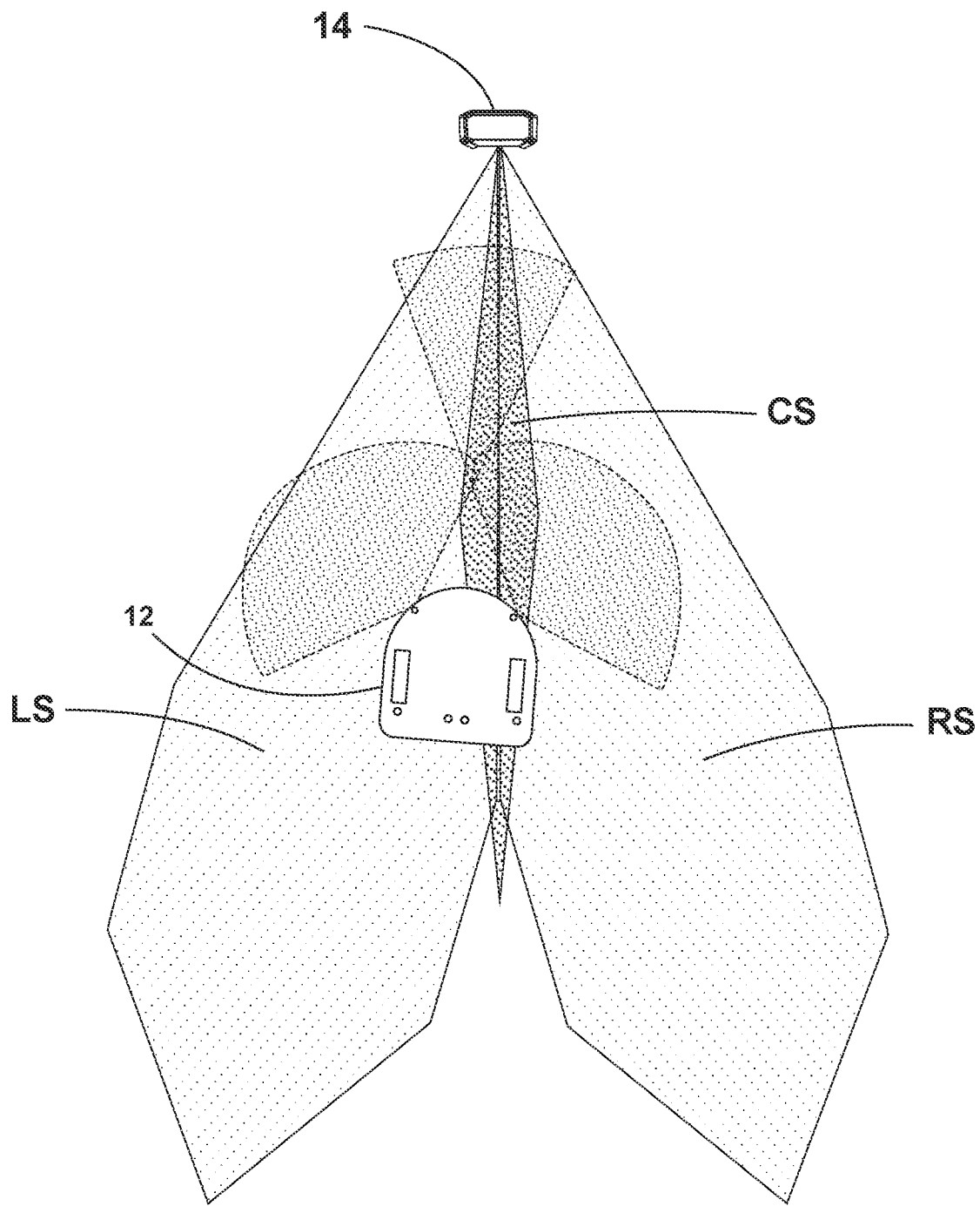
Figure 34:
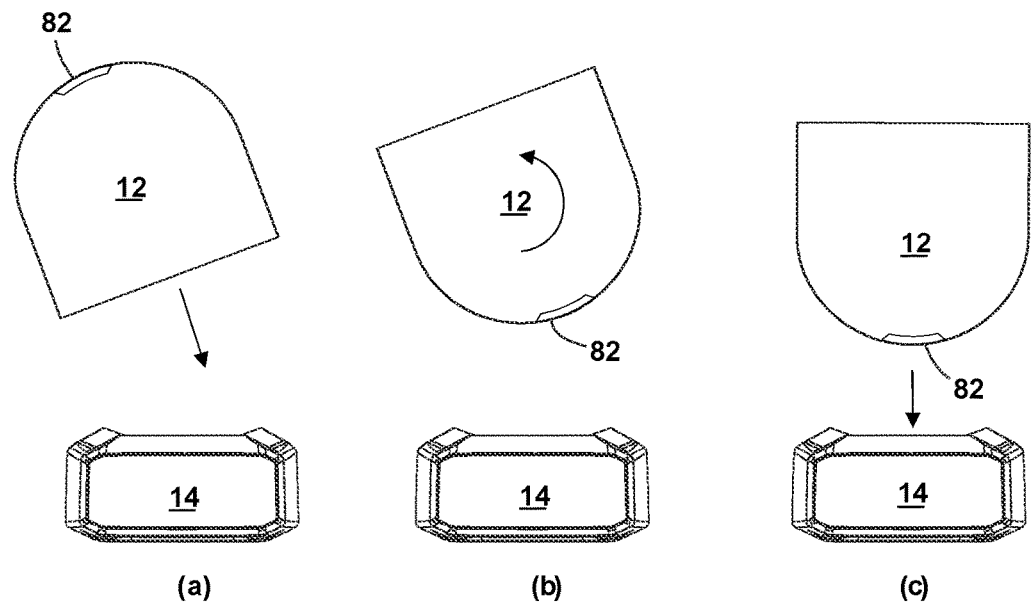
Figure 34:
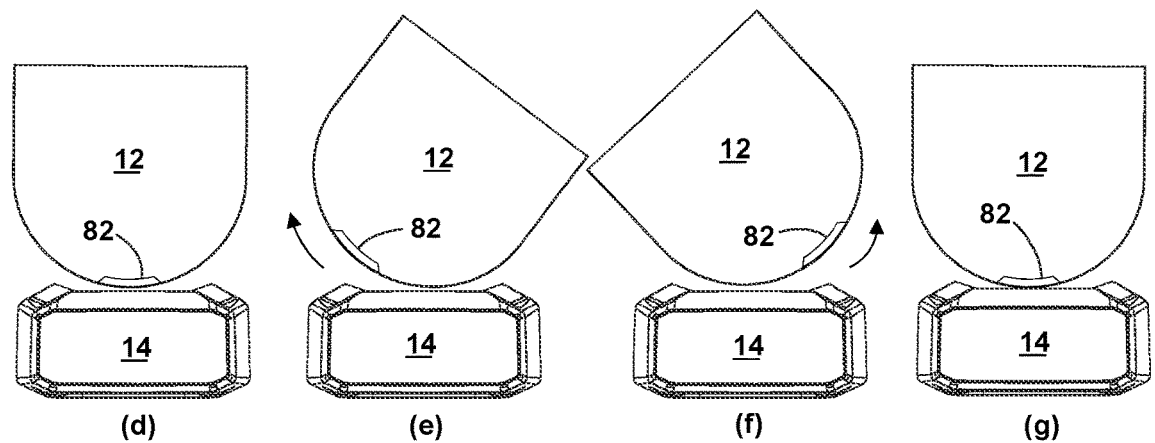

FIGS. 29-34 show one example of the robot 12 docking with the docking station 14 according to the docking method of FIGS. 21-23. FIG. 29 generally shows an overall path P of the robot 12 to the docking station 14. FIG. 30 shows the robot 12 searching for and detecting a long docking signal, shown in the present example as the left long docking signal LL, per steps 308-310 of the method 300, and then rotating until the long docking signal LL is detected by both center or front receivers 116CR, 116CL, per step 316. FIG. 31 shows the robot 12 driving until a short docking signal is detected, shown in the present example as the left short docking signal LS, and then turning toward the center short signal CS, per steps 318-328 of the method 300. In FIG. 31, the robot 12 detects the center short signal CS on the left side receiver 116SL and so turns right approximately 90 degrees. FIG. 31 also shows a second robot 12' in phantom line, which in the illustrated example detects the right short signal RS on the right side receiver 116SR and so turns right approximately 90 degrees. FIG. 32 shows the robot 12 scanning for the center short signal CS to calculate a heading to the docking station 14 and rotating to the calculated heading, per steps 336-338 of the method 300. FIG. 33 shows the robot 12 backing up to the docking station 14, while arcing left or right as needed to keep the center short docking signal CS within range of both rear receivers 116RR, 116RL, per steps 340-348 of the method 300. FIG. 34 shows the robot 12 performing steps 318-352 of the method 300, including driving toward the docking station 14 at (a), turning around to position in its charging contacts 82 toward the docking station 14 at (b), backing up to the docking station 14 at (c)-(d), performing a nuzzle at (e)-(f), and completing docking at (g).

Figure 24:
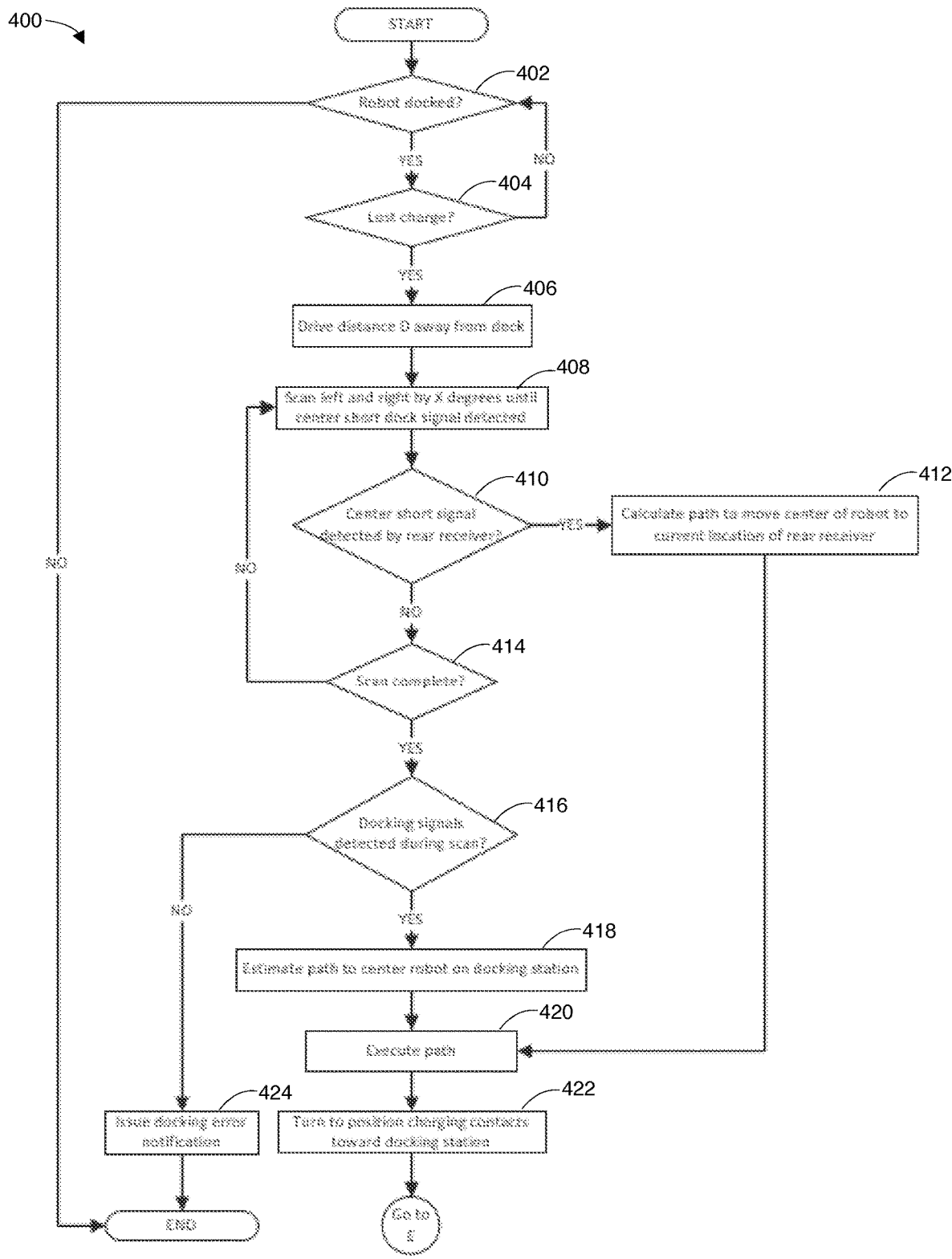
FIG. 24 is a flow chart showing one embodiment of a method for re-docking a robot at a docking station after a lost charge.

FIG. 24 is a flow chart showing one embodiment of a method 400 for re-docking the robot 12 at the docking station 14 after a lost charge. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

After a successful docking, the robot 12 may lose charging contact with the docking station 14, for instance if either the robot 12 or docking station 14 is bumped. Once successfully, docked, the robot 12 may continuously or intermittently monitor whether the robot 12 remains docked. At step 402, if the robot 12 is docked, the controller 30 next determines whether the battery is charging or has lost charge at step 404.

If charging has been lost, the method proceeds to step 406, where the robot drives a predetermined distance D away from the docking station 14. The predetermined distance D can be a distance that will keep the robot 12 within range of the short docking signals LS, CS, RS. In one example, the predetermined distance D can be in the range of one to three feet (approximately 0.3 to 0.9 m), alternatively one to two feet (approximately 0.3 to 0.6 m), and alternatively 12-18 inches (approximately 0.3 to 0.46 m). To drive away from the docking station 14, the robot 12 can operate both drive wheels 64 (FIG. 3) in the forward direction for a predetermined time or number of revaluations.

Next, at step 408, the robot 12 performs a scan in an attempt to detect the center short docking signal CS. Performing the scan can comprise rotating left and right a predetermined angle from the robot's current position, such as rotating ±90 degrees, alternatively rotating ±45 degrees, alternatively rotating ±20 degrees. The robot 12 can perform a zero-radius turn for the scan.

During the scan, at step 410 the robot 12 monitors for detection of the center short docking signal CS by one of the rear receivers 116RR, 116RL. If the center short docking signal CS is detected by either rear receivers 116RR, 116RL during the scan, at step 412 the robot 12 calculates a path that will move the center of the robot 12 to the current location of the rear receiver 116RR, 116RL that detected the center short docking signal CS. The calculated path can include rotation instructions, such as what direction to rotate the robot 12 (e.g. left or right) and the number of degrees to rotate. The path can additionally or alternatively include translation instructions, such as how far to drive the robot 12 in reverse or how far to drive the robot 12 forward. With the embodiment of the robot 12 shown in FIG. 6, where the rear receivers 116RR, 116RL are positioned substantially near the outer edge of the robot 12, the path can be an overall translation of less than ½ the width of the robot 12.

At step 414, the robot 12 can continue to scan while monitoring for detection of the center short docking signal CS. If, at step 414, the scan completes without finding the center short docking signal CS, the method 400 proceeds to step 416 and determines if any docking signals were detected during the scan. If no docking signals were detected, the method 400 can proceed to step 424 and the robot 12 issues a docking error notification. The docking error notification can be a visual notification on the display 86 or elsewhere on the robot 12, or an audible notification issued from the robot 12. Additionally or alternatively, the docking station 14 can issue a docking error notification.

If one or more docking signals were detected during the scan, the method 400 can proceed to step 418 and a path that will move the center of the robot into alignment with the center of the docking station 14 is estimated. The path can be estimated based on which side of the robot detected more docking signals during the scan. Based on which receivers detect docking signals, the robot 12 can estimate its orientation relative to the docking station 14, and the estimate path can be a predetermined path based on the robot's estimated orientation that can reliably get the robot 12 into alignment with the center of the docking station 14.

The estimated path can include rotation instructions, such as what direction to rotate the robot 12 (e.g. left or right) and the number of degrees to rotate. The path can additionally or alternatively include translation instructions, such as how far to drive the robot 12 in reverse or how far to drive the robot 12 forward.

From the path calculation at step 412 or the path estimation at step 418, the method 400 proceeds to step 420 and the robot 12 executes the path. If the path includes both rotation instructions and translation instructions, the robot 12 can execute the rotation instructions first, and thereafter execute the translation instructions. After executing the path, the robot 12 should be at a position in which the robot is aligned with the center of the docking station 14.

Next, at step 422, the robot 12 turns to position its charging contacts 82 toward the docking station 14. Because the robot 12 should be aligned centered on the docking station 14, the robot 12 can rotates ±180 degrees, or substantially 180 degrees, at step 422.

The method 400 then proceed to step 348 (FIG. 23) of the docking method 300, and begins final docking steps in an attempt to reestablish charging.

Figure 25:
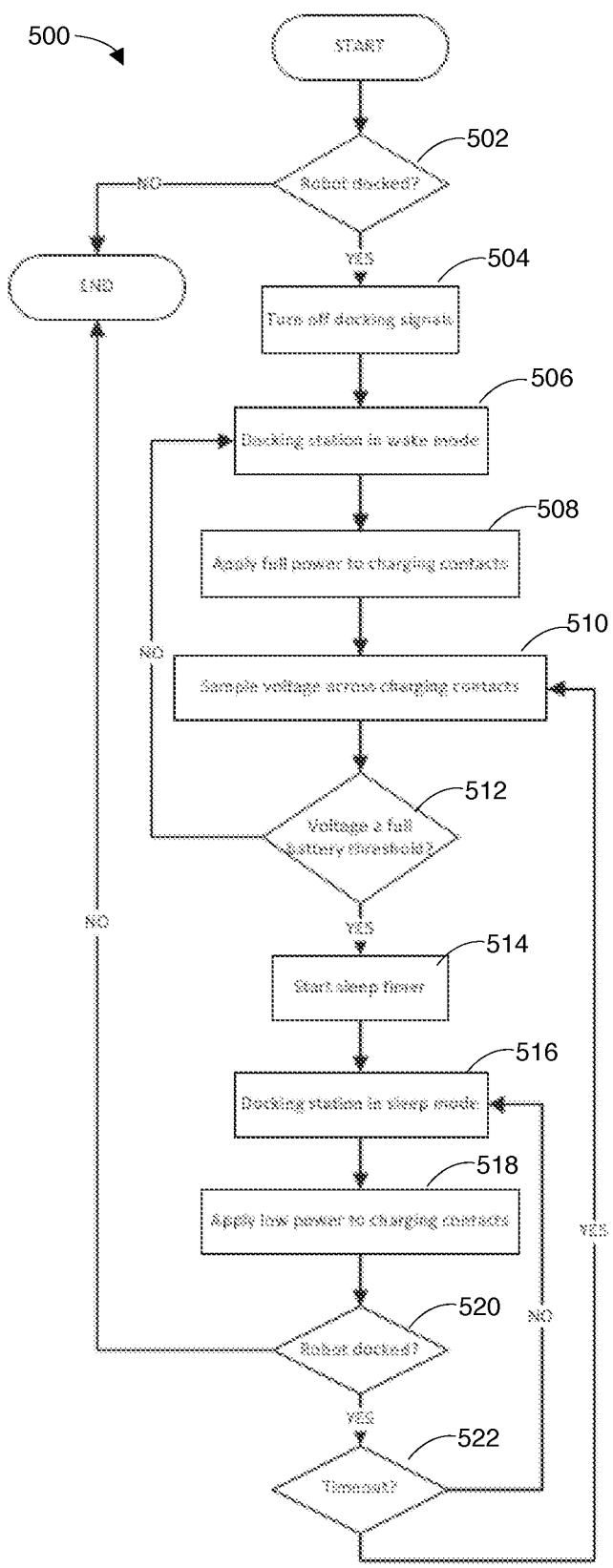
FIG. 25 is a flow chart showing one embodiment of a method for low power charging of a robot by a docking station.

FIG. 25 is a flow chart showing one embodiment of a method 500 for low power charging of the robot 12 by the docking station. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

In one embodiments, while the robot 12 is docked, the docking station 14 is configured to operate in a wake mode and in a sleep mode, and wherein the docking station is further configured to enter the sleep mode after completely charging the battery 80 and stop charging the battery 80, and resuming charging the battery 80 after switching from the sleep mode to the wake mode. In such embodiments, the docking station 14 may further be configured to revert to the sleep mode once the battery 80 is sufficiently charged, i.e. topped off.

After the battery 80 of the robot 12 completely charges, it will slowly discharge even while the robot 12 is sitting idle on the docking station 14. In one embodiment, instead of just continually "topping off" the battery 80, the docking station 14 can optionally enter a sleep mode and periodically wake up to top off the battery 80. The sleep mode can last a predetermined period of time, also referred to herein as a sleep time. That is, the docking station 14 will wake up from the sleep mode after the sleep time elapses to top off the battery 80.

Optionally, a user can select the length of the sleep time. For example, the docking station 14 can have a default sleep time, such as one hour or another period, and the user can optionally change the sleep time from the default setting. Energy conscious users can, for example, select a longer sleep time than the default time. In one embodiment, the docking station 14 can be operable in at least a high power charging mode having a first sleep time or a low power charging mode having a second sleep time that is longer than the first sleep time. In one non-limiting example, the first sleep time can be one hour and the second sleep time can be 30 hours. The docking station 14 can have additional charging modes between the high and lower power modes, which accordingly have sleep times between the first and second sleep times. The charging mode can be selected by a user on the docking station 14, or using a mobile device, such as a smartphone or tablet, in operable communication with the docking station 14.

In one embodiment, the user can perform a sequence on the docking station 14, such as by pressing one of the charging contacts 122P, 122N a predetermined number of times within a predetermined time period (e.g. pressing the upper charging contact 122P three times in two seconds) to cycle the sleep time between the first and second sleep times, or between the modes.

At step 502, if the robot 12 is docked successfully, docking signals are turned off at step 504. For example, the transmitters 124 can be deactivated.

The docking station 14 is initially in the wake mode at step 506. In the wake mode, full power is applied to the charging contacts 122 at step 508. With full power applied from the docking station contacts 122 to the robot's charging contacts 82, the battery 80 charges at first, higher rate, and draws more energy from the A/C power outlet 16 (FIG. 1) or other household power supply.

Next, the robot 12 determines if the residual power level of the battery 80 is at or above a threshold value. The threshold value can be >99% capacity (i.e. fully charged). If affirmative, the docking station 14 can go to sleep. In the embodiment shown, to determine if the residual power level of the battery 80 is at or above the threshold value, at step 510, the robot 12 can sample the voltage across its charging contacts 82. If the voltage is below a full battery threshold, the docking station 14 continues charging the robot 12 in the wake mode, i.e. at full power. If the voltage is at or above a full battery threshold, the docking station 14 can go to sleep.

At step 514, the docking station 14 starts a sleep timer and the docking station 14 ends the sleep mode at step 516. In the sleep mode, the docking station 14 applies low power to the charging contacts 122 at step 518. With low power applied from the docking station contacts 122 to the robot's charging contacts 82, the battery 80 charges more slowly, conserving energy.

In the sleep mode, the docking station 14 can monitor whether the robot 12 remains docked. In one example if the activating switch 168 remains closed, then the docking station 14 assumes the robot 12 is docked. If the robot 12 undocks, e.g. if the activating switch 168 opens, the method 500 ends. If the robot 12 remains docked at the sleep timer runs out at step 522, the method 500 returns to step 510 and the robot 12 determines if the residual power level of the battery 80 is at or above a threshold value, such as by sampling the voltage across its charging contacts 82. If the voltage is at or above a full battery threshold, the docking station 14 the sleep timer is restarted at step 514 and the docking station 14 can remain asleep at step 514. If the voltage is below a full battery threshold, the docking station 14 can wake up at step 506 and full power can be applied at step 508. Upon re-entering the wake mode, the system 10 may issue an alert to the user that the robot 12 is being charged at full power, such as by illuminating an indicator light on the robot 12 or docking station 14, displaying an icon on a user interface of the robot 12, or issuing an audible alert.

Figure 26:
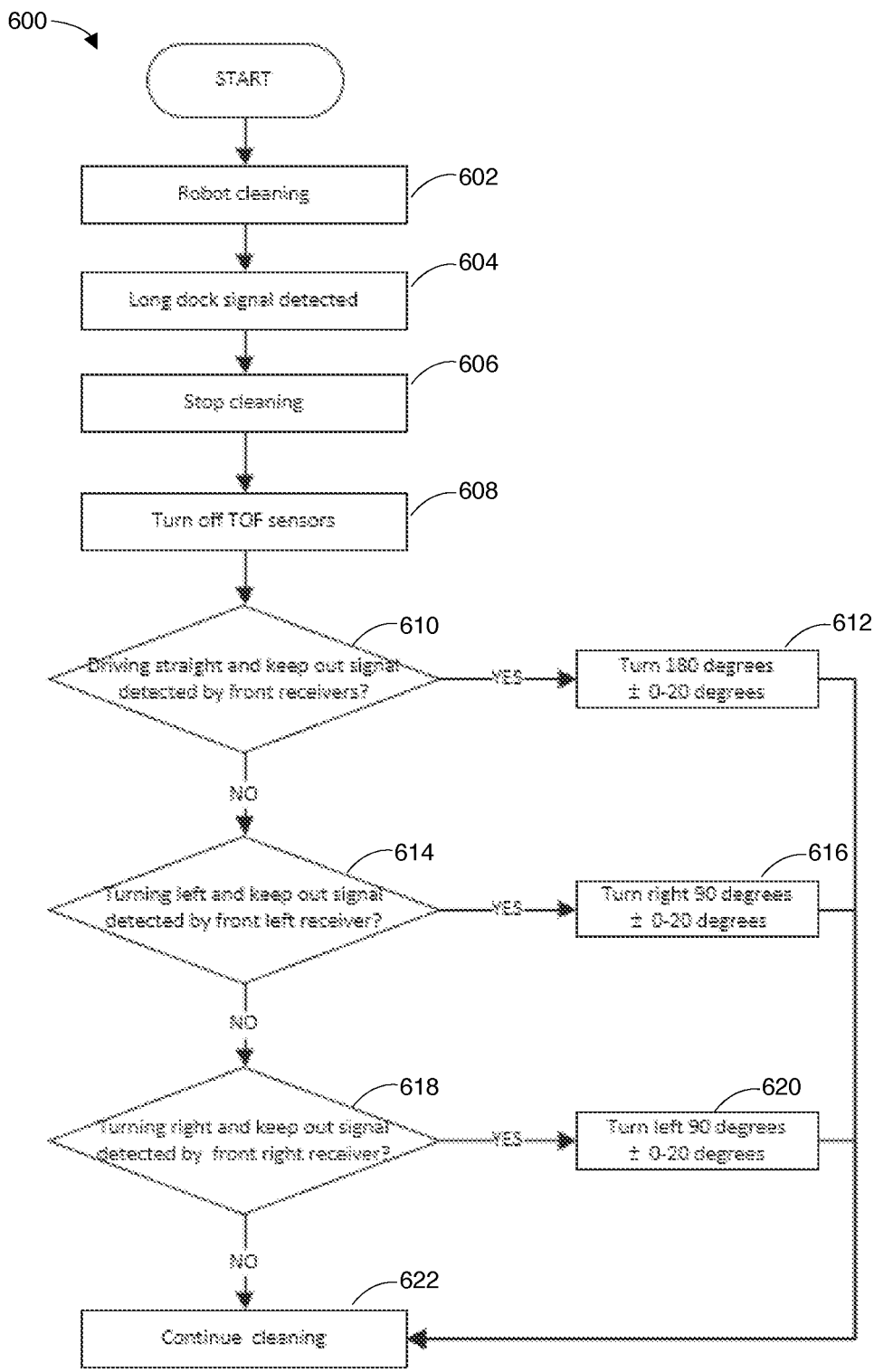
FIG. 26 is a flow chart showing one embodiment of a method for docking station avoidance performed by a robot.

FIG. 26 is a flow chart showing one embodiment of a method 600 for docking station avoidance performed by the robot 12. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

At step 602, the robot is cleaning During cleaning, the vacuum motor 50 and/or brush motor 60 may be activated.

At step 604, the robot 12 detects a long docking signal LL, CL, RL. This signals to the robot 12 that the docking station 14 is nearby. The robot 12 next takes steps to avoid the docking station 14. Before starting the avoidance steps, at step 606, the robot 12 can optionally stop cleaning. This can conserve battery life while the robot 12 navigates around and/or away from the docking station 14. Stopping cleaning may include turning off the vacuum motor 50 and/or the brush motor 60.

The method 600 proceeds to step 608, and the TOF sensors 94 can be turned off. The robot 12 now relies on the passive IR receivers 116 and docking signals to avoid the docking station 14.

Various avoidance behaviors may be executed by the robot 12. In the embodiment shown, at step 610, the robot 12 drives straight and determines whether at least one keep out signal KO is detected by the front receivers 116CR, 116CL. If so, then it can be assumed that the robot 12 is driving straight toward the docking station. Optionally, the robot 12 can drive straight until at least one keep out signal KO is detected or until the robot encounters an obstacle.

At step 612, if a keep out signal KO is detected, the robot 12 rotates 180 degrees, or substantially 180 degrees, to turn away from the docking station 14. Optionally, the robot 12 can rotate 180 degrees ±n degrees, where n is a randomly generated number from 0 to 20. Using a randomly-generated number can prevent the robot 12 from getting stuck driving in the same pattern over and over. The robot 12 then resumes cleaning at step 622.

If, at step 610, no keep out signals are detected by the front receivers 116CR, 116CL, the method 600 proceeds to step 614 and the robot 12 turns left and determines whether at least one keep out signal KO is detected by the front left receiver 116CL. In turning left, the robot 12 can perform a zero-radius turn of approximately 90 degrees, up to 180 degrees. If a keep out signal KO is detected by the front left receiver 116CL, then it can be assumed that the docking station 14 is to the left of the robot 12. At step 616, the robot 12 turns right 90 degrees, or substantially 90 degrees, to turn away from the docking station 14. Optionally, the robot 12 can rotate 90 degrees ±n degrees, where n is a randomly generated number from 0 to 20. The robot 12 then resumes cleaning at step 622.

If, at step 614, no keep out signals are detected by the front left receiver 116CL, the method 600 proceeds to step 618 and the robot 12 turns right and determines whether at least one keep out signal KO is detected by the front right receiver 116CR. In turning right, the robot 12 can perform a zero-radius turn of approximately 90 degrees, up to 180 degrees, If a keep out signal KO is detected by the front right receiver 116CR, then it can be assumed that the docking station 14 is to the right of the robot 12. At step 620, the robot 12 turns left 90 degrees, or substantially 90 degrees, to turn away from the docking station 14. Optionally, the robot 12 can rotate 90 degrees ±n degrees, where n is a randomly generated number from 0 to 20. The robot 12 then resumes cleaning at step 622.

It is noted that, during the avoidance method 600, there may be scenarios where the robot is turning left and a keep out signal KO is detected by the front right receiver 116CR or where the robot is turning right and a keep out signal KO is detected by the front left receiver 116CL. Such scenarios are illogical and may be caused by reflections of the keep out signals KO from nearby objects. As such, the robot 12 can ignore this input.

Figure 27:
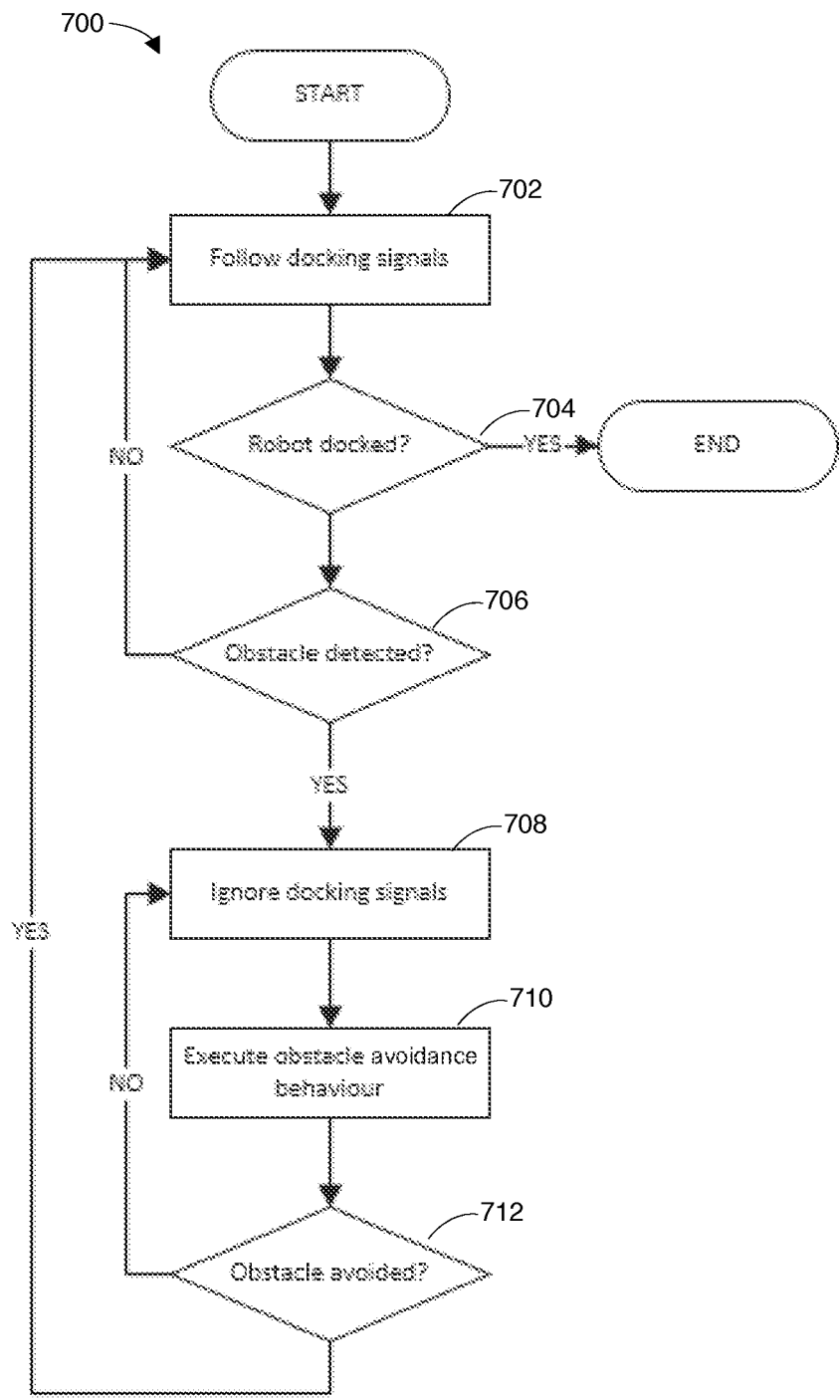
FIG. 27 is a flow chart showing one embodiment of a method for obstacle response during docking performed by a robot.

FIG. 27 is a flow chart showing one embodiment of a method 700 for obstacle response during docking performed by the robot 12. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

During docking or re-docking, such as when following the methods outlined in FIGS. 21-24, the robot 12 may encounter an obstacle. The obstacle response method 700 is one embodiment of a process the robot 12 can follow in order to efficiently avoid the obstacle and resume docking with minimal time and/or battery life expended.

A step 702, the robot 12 is following at least one docking signal emitted by the docking station 14 in order to dock or re-dock with the docking station 14. At step 704, if the robot 12 successfully docks while following the docking signals, the method 700 ends. If not, the robot 12 continues to follow the docking signals. If an obstacle is detected by the robot 12 at step 706 while following docking signals, the method 700 proceeds to step 708 and the robot 12 temporality ignores all docking signals from the docking station 14.

In one embodiment, an obstacle can be detected based on input from the bump sensors 102 or cliff sensor 106. For the purposes of the obstacle response method 700, an obstacle may include any obstacle that registers on one of the bump sensors 102 or an excessive drops or cliff that registers on one of the cliff sensors 106. It is noted that in at least some embodiments, the TOF sensors 94 may be turned off for docking or re-docking. Therefore, while the robot 12 is following docking signals at step 702, the TOF sensors 94 do not provide input for obstacle detection. In other embodiments where at least one of the distance sensors 94 does not comprise a TOF sensor, input from the distance sensor 94 can be used to detect an obstacle.

Next, while ignoring all docking signals, the robot 12 executes an obstacle avoidance behavior at step 710. The obstacle avoidance behavior can be selected by the controller 30 based on input from the sensor or sensors that detected the obstacle. For example, the robot 12 can change direction (e.g., reversing and/or turning) or begin a wall following routine. During step 710, the robot 12 can modify, update, or change the obstacle avoidance behavior based on updated input from one or more sensors regarding the obstacle or new obstacles encountered.

The robot 12 can continue to ignore all docking signals and execute an obstacle avoidance behavior until the obstacle is avoided at step 712. The controller 30 can determine that the obstacle has been avoided based on sensor input. Once the obstacle has been avoided, the method 700 can proceed to step 702, and the robot 12 can resume following docking signals from the docking station 14. It is noted that, in some embodiments, if the obstacle avoidance behavior has moved the robot 12 outside the range of all docking signals, the robot 12 may need to search for docking signals, as described above for step 308 of the docking method 300 (FIG. 21), once the obstacle has been avoided.

Figure 28:
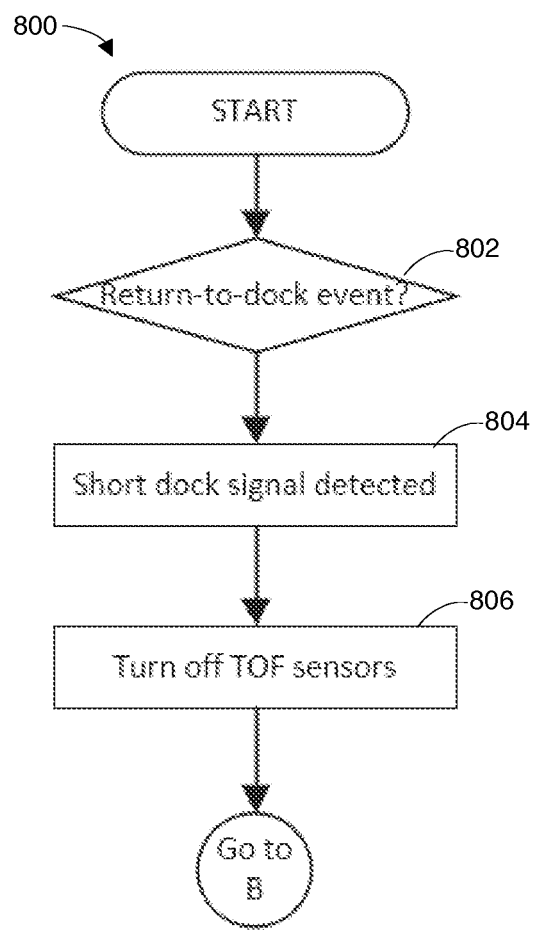
FIG. 28 is a flow chart showing one embodiment of a method for close-proximity docking performed by the robot.

FIG. 28 is a flow chart showing one embodiment of a method 800 for close-proximity docking performed by the robot 12. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

A return to dock event may sometimes occur when the robot 12 is already within range of the short range docking signals. For example, a user may set the robot 12 down close to the docking station 14 command the robot 12 to dock. In this case, the proximity of the docking station 14 can make it difficult for the robot to follow the docking method 300 described previously. At step 802, after a return-to-dock event, if the robot 12 detects a short docking signal LS, CS, RS at step 804 first, i.e. before detecting a long docking signal, then the robot 12 will follow the close-proximity docking method 800. At step 806, the TOF sensors 94 can be turned off. The robot 12 now relies on the passive IR receivers 116 and short docking signals LS, CS, RS to dock with the docking station 14. The method then proceeds to step 320 (FIG. 21) of the normal docking method 300, where the robot 12 determines which receiver 116 detects the center short docking signal CS and docking can continue as previously described.

To the extent not already described, the different features and structures of the various embodiments of the invention, may be used in combination with each other as desired, or may be used separately. That one autonomous floor cleaning system, robot, or docking station is illustrated herein as having the described features does not mean that all of these features must be used in combination, but rather done so here for brevity of description. The disclosed docking station may be provided independently of the disclosed robot, and vice versa. It is noted that while the methods 300, 400, 500, 600, 700, 800 are described with respect to the system 10, robot 12, and docking station 14, the methods 300, 400, 500, 600, 700, 800 can also be applied to other robots and docking stations. Further, while multiple methods are disclosed herein, one of the disclosed methods may be performed independently, or more than one of the disclosed methods, including any combination of methods disclosed herein may be performed by one robot or docking station. Thus, the various features of the different embodiments may be mixed and matched in various cleaning apparatus configurations as desired to form new embodiments, whether or not the new embodiments are expressly described.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

Likewise, it is also to be understood that the appended claims are not limited to express and particular components or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

What is claimed is:

1. A docking station for an autonomous floor cleaner, comprising:
    a housing having a bottom side on which the docking station rests and a backstop;
    charging contacts disposed on the housing configured to charge a battery of the autonomous floor cleaner;
    springs biasing the charging contacts to a neutral position corresponding to a condition in which the autonomous floor cleaner is not docked with the docking station, the charging contacts moveable to a contact position corresponding to a condition in which the autonomous floor cleaner is docked with the docking station, wherein the charging contacts are located on the backstop;
    an activating switch controlling the supply of power to the charging contacts, the activating switch configured to be actuated by at least one of the charging contacts in the contact position;
    docking signal transmitters within the housing configured to transmit light signals that are detectable by the autonomous floor cleaner, wherein the housing comprises a portion aligned with the docking signal transmitters that is one of transparent and translucent to admit light signals therethrough;
    a shroud within the housing, the shroud comprising a plurality of opaque enclosures, each one of the plurality of opaque enclosures enclosing one of the docking signal transmitters; and
    at least one of the plurality of opaque enclosures comprising a wall around one of the docking signal transmitters and an aperture in the wall through which light is emittable, the aperture defining a direction and angle of a transmission zone for the one of the docking signal transmitters.

2. The docking station of claim 1, wherein the docking signal transmitters comprise IR transmitters irradiating at least one of infrared light and near infrared light, and the wall comprises an internal surface reflective to at least one of infrared light and near infrared light.

3. The docking station of claim 2, wherein the wall comprises a concave internal surface that directs reflected light back at the one of the docking signal transmitters.

4. The docking station of claim 3, wherein the wall comprises a convex outer surface.

5. The docking station of claim 4, wherein the shroud comprises an extension extending radially from the wall adjacent the aperture.

6. The docking station of claim 1, comprising a printed circuit board assembly (PCBA) having circuitry supplying suitable voltage and current to the autonomous floor cleaner via the charging contacts when the autonomous floor cleaner is docked, wherein the docking signal transmitters are electrically connected to and controlled by the PCBA.

7. The docking station of claim 6, comprising a seal between the PCBA and the shroud, wherein the seal is opaque to wavelengths of light emitted by the docking signal transmitters.

8. The docking station of claim 1, wherein the shroud comprises a plurality of walls and a plurality of apertures, wherein a first aperture of the plurality of apertures is narrower than a second aperture of the plurality of apertures, the first aperture defining a first signal transmission zone that is narrower than a second signal transmission zone defined by the second aperture.

9. The docking station of claim 8, wherein:
    the first aperture is in axial alignment with a first one of the docking signal transmitters such that a signal from the first one of the docking signal transmitters is emittable straight out from the docking station in the first signal transmission zone; and
    the second aperture is offset from a second one of the docking signal transmitters such that a signal from the second one of the docking signal transmitters is emittable at an angle from the docking station in the second signal transmission zone; and
    the second signal transmission zone crosses the first signal transmission zone.

10. The docking station of claim 1, wherein the aperture is defined by a first edge of the wall and a second edge of the wall, the first and second edges being spaced apart to define a width of the aperture, wherein the first edge of the aperture is aligned with the one of the docking signal transmitters to provide a crisp outer edge for the transmission zone and the second edge of the aperture is offset from the one of the docking signal transmitters.

11. The docking station of claim 1, wherein the docking signal transmitters can transmit at least one long range docking signal and at least one short range docking signal having a shorter range that the at least one long range docking signal.

12. The docking station of claim 1, comprising keep out signal transmitters within the housing configured to transmit keep out signals that are detectable by the autonomous floor cleaner, wherein the keep out signal transmitters are not enclosed by the shroud.

13. A docking station for an autonomous floor cleaner, comprising:
- a housing having a bottom side on which the docking station rests and a backstop;
- charging contacts disposed on the housing configured to charge a battery of the autonomous floor cleaner;
- springs biasing the charging contacts to a neutral position corresponding to a condition in which the autonomous floor cleaner is not docked with the docking station, the charging contacts moveable to a contact position corresponding to a condition in which the autonomous floor cleaner is docked with the docking station, wherein the charging contacts are located on the backstop;
- an activating switch controlling the supply of power to the charging contacts, the activating switch configured to be actuated by at least one of the charging contacts in the contact position;
- a plurality of docking signal transmitters within the housing configured to transmit light signals that are detectable by the autonomous floor cleaner, the plurality of docking signal transmitters comprising:
  - a center transmitter configured to emit at least one light signal within a first transmission zone;
  - a right transmitter disposed laterally of the center transmitter and configured to emit at least one light signal within a second transmission zone; and
  - a left transmitter disposed laterally of the center transmitter and configured to emit at least one light signal within a third transmission zone;
- a shroud within the housing, the shroud comprising:
  - a center shroud section enclosing the center transmitter and defining a first light chamber, the center shroud section comprising an opaque first wall around the center transmitter and a first aperture in the first wall through which light is emittable, the first aperture defining a direction and angle of the first transmission zone;
  - a right shroud section enclosing the right transmitter and defining a second light chamber, the right shroud section comprising an opaque second wall around the right transmitter and a second aperture in the second wall through which light is emittable, the second aperture defining a direction and angle of the second transmission zone; and
  - a left shroud section enclosing the left transmitter and defining a third light chamber, the left shroud section comprising an opaque third wall around the left transmitter and a third aperture in the third wall through which light is emittable, the third aperture defining a direction and angle of the third transmission zone.

14. The docking station of claim 13, wherein:
- the first aperture is in axial alignment with the center transmitter such that a signal from the center transmitter is emittable straight out from the docking station in the first transmission zone;
- the second aperture is offset from the right transmitter such that the second transmission zone crosses the first and third transmission zones, and such that a signal from the right transmitter is emittable at an angle from the docking station in the second transmission zone; and
- the third aperture is offset from the left transmitter such that the third transmission zone crosses the first and second transmission zones, and such that a signal from the left transmitter is emittable at an angle from the docking station in the third transmission zone.

15. The docking station of claim 13, wherein the first aperture is narrower than the second and third apertures, and the first transmission zone is narrower than the second and third transmission zones.

16. The docking station of claim 13, comprising at least one keep out signal transmitter configured to transmit keep out signals that are detectable by the autonomous floor cleaner, wherein the at least one keep out signal transmitter is not enclosed by the shroud.

17. A method for docking an autonomous floor cleaner with a docking station, the autonomous floor cleaner having a plurality of distance sensors configured to detect obstacles, the method comprising:
- registering a return-to-dock event at the autonomous floor cleaner;
- searching for docking signals transmitted by the docking station;
- turning off the plurality of distance sensors of the autonomous floor cleaner upon detecting a first docking signal transmitted by the docking station;
- receiving, with at least one passive receiver of the autonomous floor cleaner, at least one other docking signal transmitted by the docking station;
- driving the autonomous floor cleaner toward the docking station based on the at least one other docking signal received by the at least one passive receiver;
- maneuvering the autonomous floor cleaner to align charging contacts on the autonomous floor cleaner with charging contacts on the docking station; and
- docking the autonomous floor cleaner with the docking station.

18. The method of claim 17, comprising:
- driving the autonomous floor cleaner away from the docking station upon determining that charging contact between the autonomous floor cleaning and the docking station is lost;
- realigning the autonomous floor cleaner with the docking station based on at least one short range docking signal received by the at least one passive receiver; and
- re-docking the autonomous floor cleaner with the docking station.

19. The method of claim 17, comprising:
- charging a battery of the autonomous floor cleaner;
- entering a sleep mode of the docking station and lowering power applied to the charging contacts of the docking station; and waking up the docking station after a sleep time and applying full power to the charging contacts of the docking station.

* * * * *